(12) United States Patent
Baker et al.

(10) Patent No.: US 11,495,028 B2
(45) Date of Patent: Nov. 8, 2022

(54) OBSTACLE ANALYZER, VEHICLE CONTROL SYSTEM, AND METHODS THEREOF

(71) Applicant: Intel Corporation, Santa Clara, CA (US)

(72) Inventors: Jeffrey Baker, El Dorado Hills, CA (US); Daniel Pohl, Puchheim (DE)

(73) Assignee: Intel Corporation, Santa Clara, CA (US)

(*) Notice: Subject to any disclaimer, the term of this patent is extended or adjusted under 35 U.S.C. 154(b) by 641 days.

(21) Appl. No.: 16/145,254

(22) Filed: Sep. 28, 2018

(65) Prior Publication Data

US 2019/0050652 A1 Feb. 14, 2019

(51) Int. Cl.
*G06V 20/58* (2022.01)
*B60W 30/16* (2020.01)
(Continued)

(52) U.S. Cl.
CPC ............ *G06V 20/58* (2022.01); *B60W 30/16* (2013.01); *B60W 40/04* (2013.01); *B60W 40/09* (2013.01); *H04W 4/46* (2018.02)

(58) Field of Classification Search
CPC .. G06K 9/00805; B60W 30/16; B60W 40/09; B60W 40/04; B60W 30/18163; H04W 4/46
See application file for complete search history.

(56) References Cited

U.S. PATENT DOCUMENTS

| | | | | |
|---|---|---|---|---|
| 5,937,079 A | * | 8/1999 | Franke | G06K 9/209 |
| | | | | 382/103 |
| 6,681,160 B2 | * | 1/2004 | Bidaud | B61K 9/08 |
| | | | | 701/19 |

(Continued)

FOREIGN PATENT DOCUMENTS

| | | | | |
|---|---|---|---|---|
| CN | 104981699 A | * | 10/2015 | G01W 1/00 |
| CN | 105358399 A | * | 2/2016 | B60W 30/16 |

(Continued)

OTHER PUBLICATIONS

"Car Recognition API, Computer Vision Vehicle Recognition", 2018, 6 pages, Blippar.
L. Yang et al. "A Large-Scale Car Dataset for Fine-Grained Categorization and Verification", 2015, 9 pages, The Chinese University of Hong Kong and Chinese Academy of Sciences, Shenzhen, China.

* cited by examiner

*Primary Examiner* — Behrang Badii
*Assistant Examiner* — Jalal C Coduroglu
(74) *Attorney, Agent, or Firm* — Viering, Jentschura & Partner mbB

(57) ABSTRACT

According to various aspects, an obstacle analyzer may include: one or more sensors configured to receive obstacle identification information representing one or more identification features of an obstacle and obstacle condition information associated with one or more conditions of the obstacle; and one or more processors configured to identify the obstacle based on the received obstacle identification information and generate an identification value corresponding to the identified obstacle, determine a rating value representing a risk potential of the identified obstacle based on the received obstacle condition information, and store the rating value assigned to the identification value of the identified obstacle in one or more memories.

19 Claims, 15 Drawing Sheets

(51) Int. Cl.
  *H04W 4/46* (2018.01)
  *B60W 40/09* (2012.01)
  *B60W 40/04* (2006.01)

(56) References Cited

U.S. PATENT DOCUMENTS

| | | | | |
|---|---|---|---|---|
| 7,617,511 | B2* | 11/2009 | Marsh | H04N 7/163 725/45 |
| 7,657,479 | B2* | 2/2010 | Henley | G06Q 40/04 705/37 |
| 8,615,357 | B2* | 12/2013 | Simon | G08G 1/165 701/96 |
| 8,725,312 | B2* | 5/2014 | Mori | G07C 5/0808 701/1 |
| 8,885,948 | B2* | 11/2014 | Holeva | G06T 7/20 382/202 |
| 8,984,216 | B2* | 3/2015 | Fillingim | G06F 1/3221 711/105 |
| 9,007,197 | B2* | 4/2015 | Breed | G01S 17/931 340/436 |
| 9,008,890 | B1* | 4/2015 | Herbach | G07C 5/008 340/436 |
| 9,053,593 | B2* | 6/2015 | Sugimoto | G07C 5/02 |
| 9,110,163 | B2* | 8/2015 | Rogan | G01S 17/50 |
| 9,171,409 | B2* | 10/2015 | Lee | G07C 5/008 |
| 9,308,919 | B2* | 4/2016 | Schmudderich | G06N 5/04 |
| 9,434,352 | B1* | 9/2016 | Prokhorov | G05D 1/0293 |
| 9,457,813 | B2* | 10/2016 | Hoerwick | G08G 1/056 |
| 9,495,875 | B2* | 11/2016 | Dowdall | B60R 21/013 |
| 9,553,937 | B2* | 1/2017 | Hubbard | H04N 21/20 |
| 9,576,480 | B1* | 2/2017 | Shoshan | G08G 1/096716 |
| 9,646,428 | B1* | 5/2017 | Konrardy | G07C 5/0816 |
| 9,652,980 | B2* | 5/2017 | Zhang | G06K 9/00805 |
| 9,696,175 | B2* | 7/2017 | Hansen | H04W 4/021 |
| 9,704,396 | B1* | 7/2017 | Owens | G08G 1/0965 |
| 9,731,713 | B2* | 8/2017 | Horii | B60W 30/0956 |
| 9,836,056 | B2* | 12/2017 | Ansari | G06K 9/00805 |
| 9,870,512 | B2* | 1/2018 | Rogan | G06K 9/00805 |
| 9,928,432 | B1* | 3/2018 | Sathyanarayana | G06K 9/00335 |
| 9,931,985 | B1* | 4/2018 | Pertsel | G06K 9/00805 |
| 9,934,688 | B2* | 4/2018 | Olson | G06K 9/00791 |
| 9,946,262 | B2* | 4/2018 | Ansari | G06K 9/00805 |
| 9,972,054 | B1* | 5/2018 | Konrardy | G07C 5/008 |
| 9,977,430 | B2* | 5/2018 | Shalev-Shwartz | G06N 3/006 |
| 10,026,130 | B1* | 7/2018 | Konrardy | G08G 1/166 |
| 10,029,696 | B1* | 7/2018 | Ferguson | B60W 40/09 |
| 10,065,517 | B1* | 9/2018 | Konrardy | B60P 3/12 |
| 10,066,665 | B2* | 9/2018 | Takahashi | G01L 5/0019 |
| 10,246,097 | B1* | 4/2019 | Fields | A61B 5/4094 |
| 10,460,600 | B2* | 10/2019 | Julian | G06K 9/00791 |
| 10,529,205 | B2* | 1/2020 | Arai | G06K 9/00288 |
| 10,533,860 | B2* | 1/2020 | Anderson | G01S 5/16 |
| 10,661,808 | B2* | 5/2020 | Chase | B60W 30/18172 |
| 10,671,943 | B2* | 6/2020 | Watanabe | G06Q 50/14 |
| 2003/0195838 | A1* | 10/2003 | Henley | G06F 19/328 705/37 |
| 2007/0094763 | A1* | 5/2007 | Silver | A41D 27/28 2/69 |
| 2009/0187343 | A1* | 7/2009 | Koch-Groeber | B60W 40/04 701/301 |
| 2012/0136743 | A1* | 5/2012 | McQuade | G06Q 30/0283 705/26.3 |
| 2013/0090803 | A1* | 4/2013 | Stahlin | B60W 30/09 701/30.3 |
| 2014/0092236 | A1* | 4/2014 | Findeisen | B60L 53/124 348/118 |
| 2014/0113263 | A1* | 4/2014 | Jarrell | G09B 23/28 434/262 |
| 2014/0288817 | A1* | 9/2014 | Dowdall | G08G 1/166 701/301 |
| 2014/0324519 | A1* | 10/2014 | Dennis | G06Q 10/0635 705/7.28 |
| 2015/0033305 | A1* | 1/2015 | Shear | G06F 21/6218 726/6 |
| 2015/0074002 | A1* | 3/2015 | Johnson | G06Q 50/16 705/306 |
| 2015/0092056 | A1* | 4/2015 | Rau | B60R 11/04 348/148 |
| 2015/0153735 | A1* | 6/2015 | Clarke | G06T 7/285 701/301 |
| 2015/0210312 | A1* | 7/2015 | Stein | G06K 9/00805 701/41 |
| 2016/0086285 | A1* | 3/2016 | Jordan Peters | G08G 1/096827 705/4 |
| 2016/0153419 | A1* | 6/2016 | Minegishi | B60K 6/445 290/38 C |
| 2016/0171521 | A1* | 6/2016 | Ramirez | G08G 1/0112 701/409 |
| 2016/0189116 | A1* | 6/2016 | Cattone | G06Q 10/20 705/27.2 |
| 2016/0318437 | A1* | 11/2016 | Vilakathara | B60Q 1/143 |
| 2016/0357188 | A1* | 12/2016 | Ansari | G05D 1/0274 |
| 2017/0010618 | A1* | 1/2017 | Shashua | G01C 21/3602 |
| 2017/0031361 | A1* | 2/2017 | Olson | G06K 9/00791 |
| 2017/0061812 | A1* | 3/2017 | Lahav | G09B 9/042 |
| 2017/0068761 | A1* | 3/2017 | Luquist | G06Q 10/0639 |
| 2017/0089710 | A1* | 3/2017 | Slusar | G01C 21/3602 |
| 2017/0108348 | A1* | 4/2017 | Hansen | H04W 4/021 |
| 2017/0113664 | A1* | 4/2017 | Nix | B60T 8/17558 |
| 2017/0116792 | A1* | 4/2017 | Jelinek | G07C 5/12 |
| 2017/0148102 | A1* | 5/2017 | Franke | G06Q 30/0278 |
| 2017/0154225 | A1* | 6/2017 | Stein | G08G 1/167 |
| 2017/0186323 | A1* | 6/2017 | Atkin | B60R 1/00 |
| 2017/0200061 | A1* | 7/2017 | Julian | G06K 9/00791 |
| 2017/0226947 | A1* | 8/2017 | Kawakami | B60W 10/06 |
| 2017/0242442 | A1* | 8/2017 | Minster | G06T 7/32 |
| 2017/0255966 | A1* | 9/2017 | Khoury | G07C 5/008 |
| 2017/0262715 | A1* | 9/2017 | Kozu | G08G 1/166 |
| 2017/0305349 | A1* | 10/2017 | Naboulsi | B60R 1/00 |
| 2017/0312614 | A1* | 11/2017 | Tran | G16H 40/63 |
| 2018/0011496 | A1* | 1/2018 | Fairfield | B60W 30/09 |
| 2018/0012092 | A1* | 1/2018 | Gleeson-May | G06K 9/00979 |
| 2018/0025636 | A1* | 1/2018 | Boykin | G06K 9/00335 701/1 |
| 2018/0032082 | A1* | 2/2018 | Shalev-Shwartz | G01C 21/3602 |
| 2018/0043890 | A1* | 2/2018 | Keller | B60W 30/0956 |
| 2018/0046191 | A1* | 2/2018 | Keller | B60W 30/18163 |
| 2018/0052458 | A1* | 2/2018 | Tsuji | B60W 30/143 |
| 2018/0075309 | A1* | 3/2018 | Sathyanarayana | G06V 40/20 |
| 2018/0079422 | A1* | 3/2018 | Weinstein-Raun | G08G 1/202 |
| 2018/0079423 | A1* | 3/2018 | Weinstein-Raun | B60W 30/14 |
| 2018/0097775 | A1* | 4/2018 | Obaidi | H04W 12/122 |
| 2018/0101177 | A1* | 4/2018 | Cohen | G05D 1/0246 |
| 2018/0120859 | A1* | 5/2018 | Eagelberg | B60W 60/00274 |
| 2018/0136332 | A1* | 5/2018 | Barfield, Jr. | G06T 7/70 |
| 2018/0176518 | A1* | 6/2018 | Park | H04N 5/77 |
| 2018/0178722 | A1* | 6/2018 | Ohta | B62D 15/025 |
| 2018/0196133 | A1* | 7/2018 | Sun | G01S 13/867 |
| 2018/0251134 | A1* | 9/2018 | Grewe | B60W 50/0097 |
| 2019/0042857 | A1* | 2/2019 | Endo | G01C 21/3602 |
| 2019/0050652 | A1* | 2/2019 | Baker | B60W 40/09 |
| 2019/0088132 | A1* | 3/2019 | Riggins | G05D 1/0278 |
| 2019/0251374 | A1* | 8/2019 | Sakai | B60R 21/00 |
| 2019/0258248 | A1* | 8/2019 | Moran | B60W 30/085 |
| 2020/0168099 | A1* | 5/2020 | Yamaguchi | G08G 1/166 |
| 2020/0216152 | A1* | 7/2020 | Mizuno | B63B 49/00 |
| 2020/0220344 | A1* | 7/2020 | Brocke | H02G 13/80 |

FOREIGN PATENT DOCUMENTS

| | | | | |
|---|---|---|---|---|
| CN | 106458110 A | * | 2/2017 | H04L 65/1069 |
| CN | 107015559 A | * | 8/2017 | B60W 40/04 |
| CN | 107545756 A | * | 1/2018 | G08G 1/096791 |
| CN | 107683234 A | * | 2/2018 | B60W 30/0953 |
| CN | 108431549 A | * | 8/2018 | G05D 1/0231 |
| DE | 102017113447 A1 | * | 12/2017 | B60W 40/09 |
| DE | 102016212716 A1 | * | 1/2018 | G01S 7/4021 |
| DE | 102016009763 A1 | * | 2/2018 | B60W 50/06 |
| EP | 3281830 A1 | * | 2/2018 | B60W 30/09 |

(56) References Cited

FOREIGN PATENT DOCUMENTS

| | | | | |
|---|---|---|---|---|
| KR | 20060128966 A | * | 12/2006 | ................ A61P 1/10 |
| KR | 20080112193 A | * | 12/2008 | ............. G06Q 10/10 |
| KR | 20160023638 A | * | 3/2016 | ................ A61P 19/02 |
| MX | PA00000456 A | * | 10/2004 | ............. H04L 67/12 |
| WO | WO-9702167 A1 | * | 1/1997 | ......... B60L 11/1803 |
| WO | WO-2005098688 A2 | * | 10/2005 | ............. G06Q 10/06 |
| WO | WO-2006029935 A1 | * | 3/2006 | ............. G01C 23/00 |
| WO | WO-2007026923 A2 | * | 3/2007 | ............. B60K 37/02 |
| WO | WO-2009010107 A1 | * | 1/2009 | ............. A61P 37/02 |
| WO | WO-2009117122 A2 | * | 9/2009 | ............. G16B 20/20 |
| WO | WO-2010092620 A1 | * | 8/2010 | ............. G07C 5/085 |
| WO | WO-2015014708 A1 | * | 2/2015 | ................ G08G 1/16 |
| WO | WO-2016040506 A1 | * | 3/2016 | ............. G06F 21/53 |
| WO | WO-2016098440 A1 | * | 6/2016 | ................ E02F 9/20 |
| WO | WO-2016122881 A1 | * | 8/2016 | ......... G01C 21/3461 |
| WO | WO-2017091690 A1 | * | 6/2017 | ........... G05D 1/0251 |
| WO | WO-2017120336 A2 | * | 7/2017 | ............. B60W 30/08 |
| WO | WO-2017200476 A1 | * | 11/2017 | ............. A61P 17/02 |
| WO | WO-2018005441 A2 | * | 1/2018 | ............. G06T 7/269 |
| WO | WO-2018102698 A1 | * | 6/2018 | ............. H04L 67/12 |
| WO | WO-2018150384 A1 | * | 8/2018 | ......... A61C 13/0004 |

FIG. 4
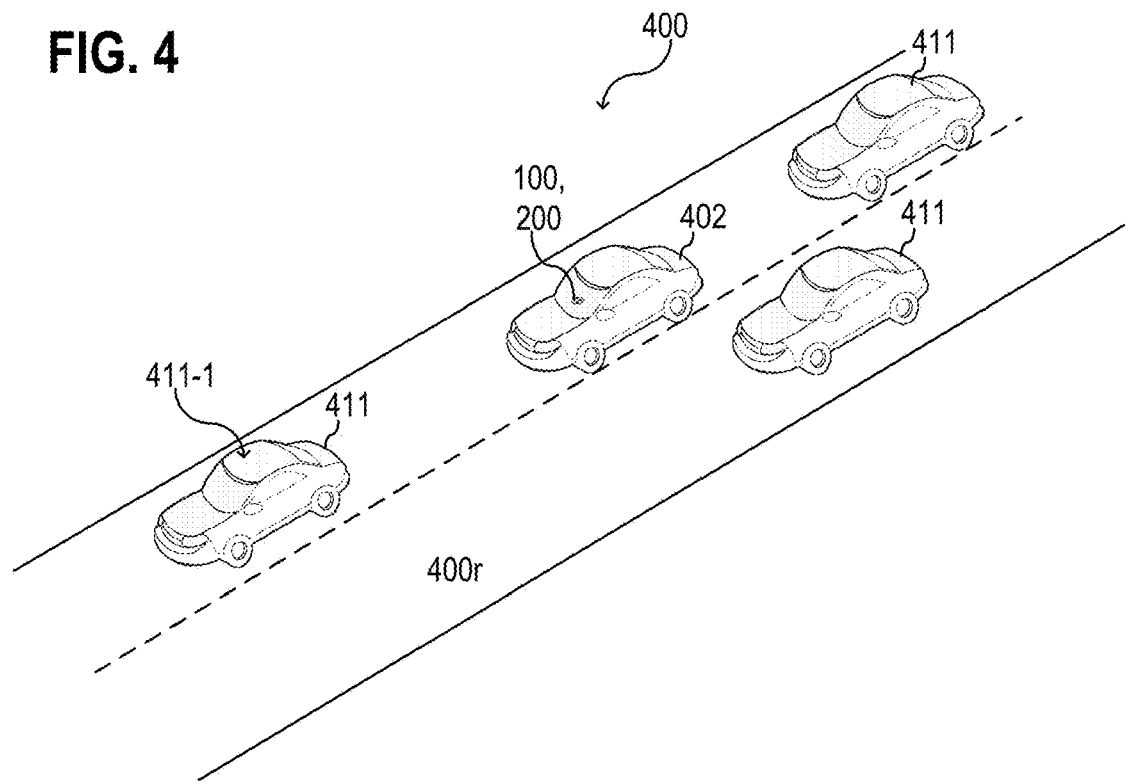
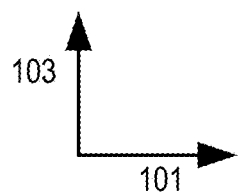

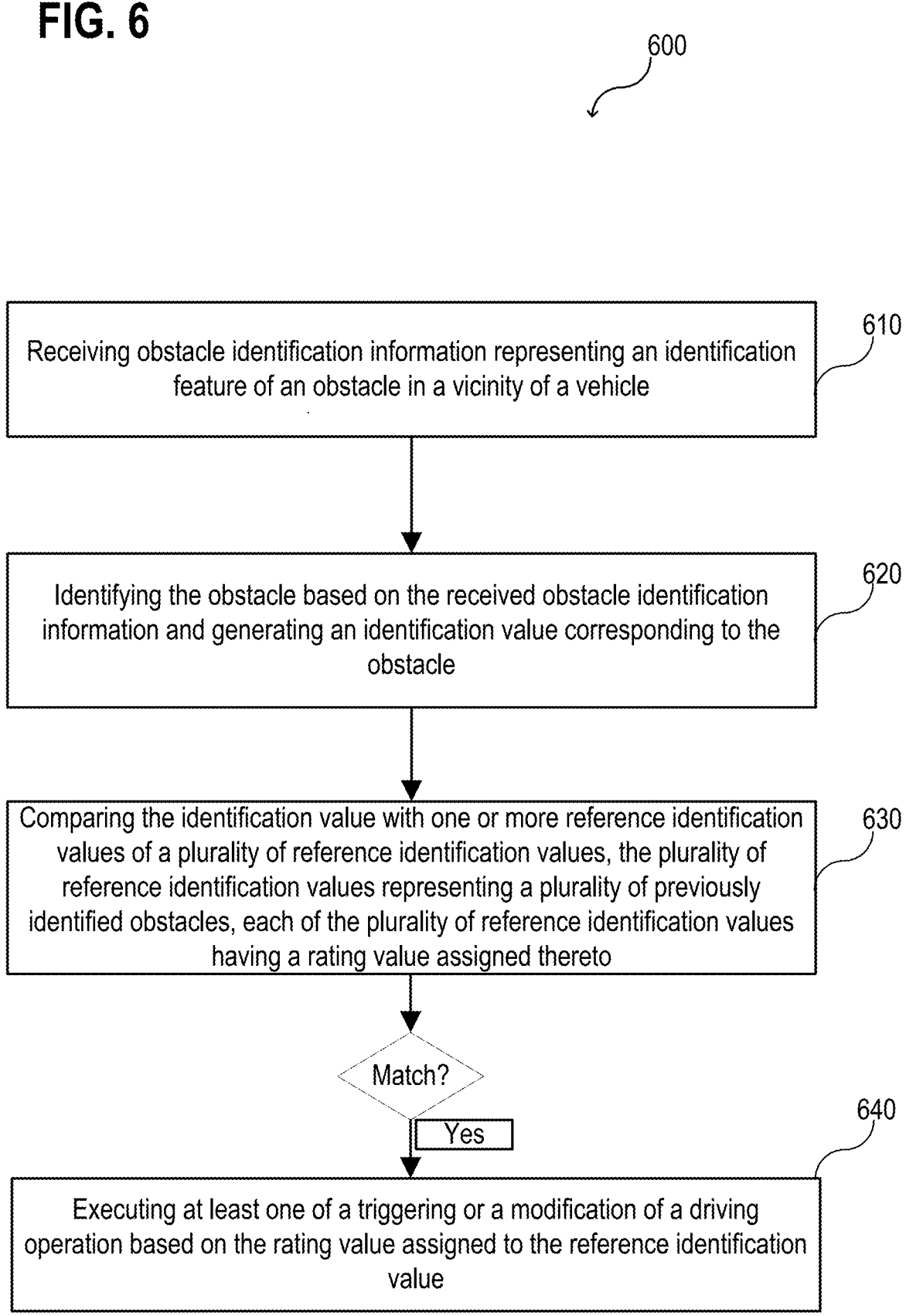

OBSTACLE ANALYZER, VEHICLE CONTROL SYSTEM, AND METHODS THEREOF

TECHNICAL FIELD

Various aspects relate generally to an obstacle analyzer, a vehicle control system, and methods thereof, e.g., method for analyzing an obstacle and a method for controlling a vehicle.

BACKGROUND

In general, modern vehicles may include various active and passive assistance systems to assist during driving the vehicle. As an example, an emergency brake assist (EBA), also referred to as brake assist (BA or BAS) may be implemented in the vehicle. The emergency brake assist may include a braking system that increases braking pressure in an emergency. The emergency may be a predicted collision of the vehicle with another vehicle or with a fixed object, as for example, a wall, a tree, etc. The vehicle may include one or more sensors and one or more processors that may be configured to predict a frontal collision of the vehicle with an obstacle. Further, one or more autonomous vehicle maneuvering functions may be implemented in a vehicle, e.g., to drive the vehicle into a parking position, to follow another vehicle that is driving ahead, to more or less autonomously drive the vehicle, as examples.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which:

FIG. 4 shows an exemplary traffic situation with a vehicle and various other vehicles, according to some aspects;

FIG. 6 shows an exemplary flow diagram of a method for controlling a vehicle, according to some aspects;

DESCRIPTION

Figure 1:
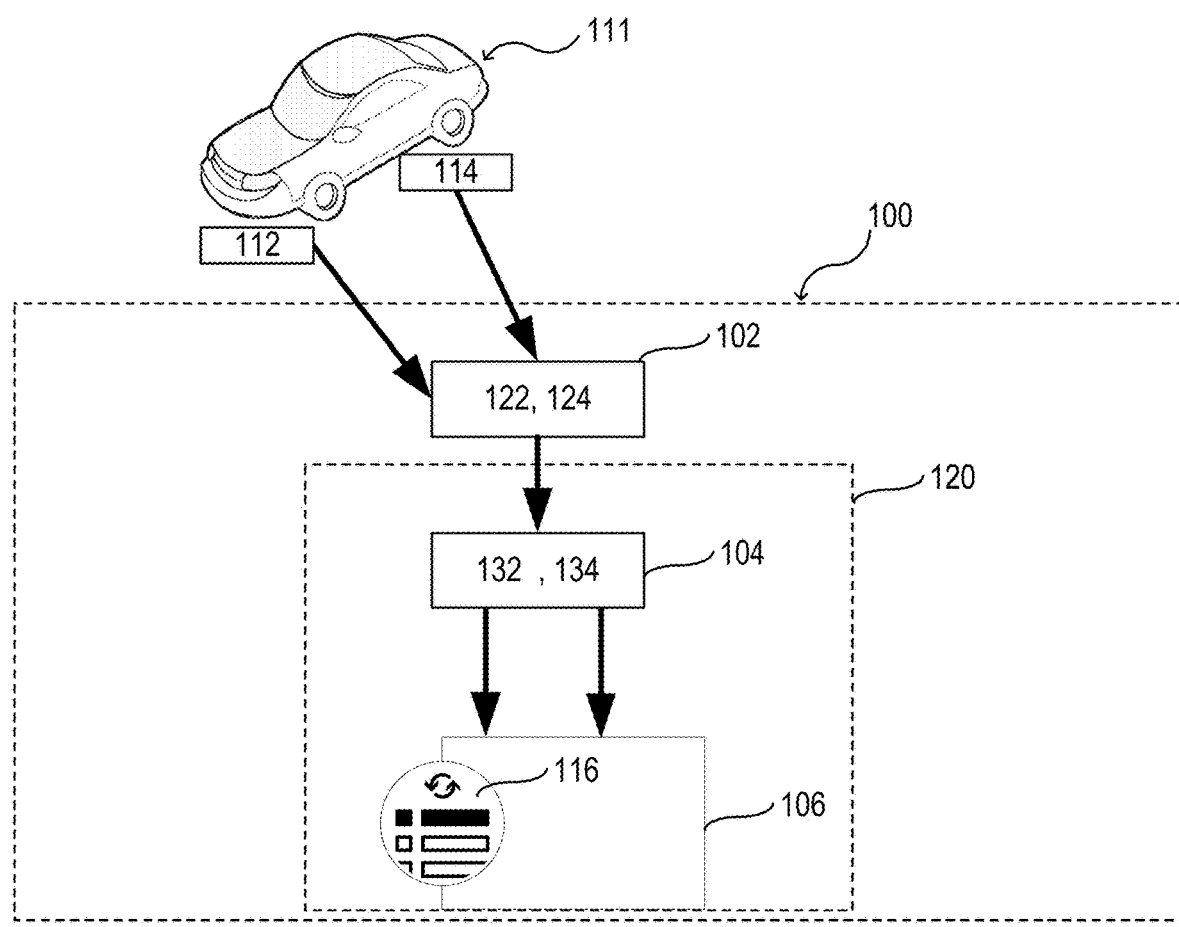
FIG. 1 shows an exemplary obstacle analyzer in a schematic view, according to some aspects.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration". Any aspect or design described herein as "exemplary" is not necessarily to be construed as preferred or advantageous over other aspects or designs.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g., "a plurality of (objects)", "multiple (objects)") referring to a quantity of objects expressly refers more than one of the said objects. The terms "group (of)", "set (of)", "collection (of)", "series (of)", "sequence (of)", "grouping (of)", etc., and the like in the description and in the claims, if any, refer to a quantity equal to or greater than one, i.e. one or more.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The term "processor" as, for example, used herein may be understood as any kind of entity that allows handling data. The data may be handled according to one or more specific functions executed by the processor. Further, a processor as used herein may be understood as any kind of circuit, e.g., any kind of analog or digital circuit. The term "handle" or "handling" as for example used herein referring to data handling, file handling or request handling may be understood as any kind of operation, e.g., an I/O operation, and/or any kind of logic operation. An I/O operation may include, for example, storing (also referred to as writing) and reading.

A processor may thus be or include an analog circuit, digital circuit, mixed-signal circuit, logic circuit, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

Differences between software and hardware implemented data handling may blur. A processor, controller, and/or circuit detailed herein may be implemented in software, hardware and/or as hybrid implementation including software and hardware.

The term "system" (e.g., a computing system, a control system, etc.) detailed herein may be understood as a set of interacting elements, wherein the elements can be, by way of example and not of limitation, one or more mechanical components, one or more electrical components, one or more instructions (e.g., encoded in storage media), and/or one or more processors, and the like.

As used herein, the term "memory", and the like may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa.

The term "vehicle" as used herein may be understood as any suitable type of vehicle, e.g., any type of ground vehicle, a watercraft, an aircraft, or any other type of vehicle. In some aspects, the vehicle may be a motor vehicle (also referred to as automotive vehicle). As an example, a vehicle may be a car also referred to as a motor car, a passenger car, etc. As another example, a vehicle may be a truck (also referred to as motor truck), a van, etc. In other aspects, the vehicle may be a partially or fully autonomously flying drone (e.g. an aeronautical taxi) having, for example, a pilot and/or one or more passengers onboard.

The term "lane" with the meaning of a "driving lane" as used herein may be understood as any type of solid infrastructure (or section thereof) on which a vehicle may drive.

In a similar way, lanes may be associated with aeronautic traffic, marine traffic, etc., as well.

According to various aspects, information (e.g., obstacle identification information, obstacle condition information, etc.) may be handled (e.g., processed, analyzed, stored, etc.) in any suitable form, e.g., data may represent the information and may be handled via a computing system. The obstacle condition may be used herein with the meaning of any detectable characteristic of the obstacle itself and/or associated with the obstacle. As an example, in the case that the obstacle is a vehicle, a driver, a passenger, a load, etc., may be associated with the vehicle. A risk that originates from a person or object that is associated with the obstacle, may be treated in the analysis (as described herein) as a risk potential assigned to the obstacle.

In some aspects, one or more range imaging sensors may be used for sensing obstacles and/or persons and/or objects that are associated with an obstacle in the vicinity of the one or more imaging sensors. A range imaging sensor may allow associating range information (or in other words distance information or depth information) with an image, e.g., to provide a range image having range data associated with pixel data of the image. This allows, for example, providing a range image of the vicinity of a vehicle including range information about one or more objects depicted in the image. The range information may include, for example, one or more colors, one or more shadings associated with a relative distance from the range image sensor, etc. According to various aspects, position data associated with positions of objects relative to the vehicle and/or relative to an assembly of the vehicle may be determined from the range information. According to various aspects, a range image may be obtained, for example, by a stereo camera, e.g., calculated from two or more images having a different perspective. Three-dimensional coordinates of points on an object may be obtained, for example, by stereophotogrammetry, based on two or more photographic images taken from different positions. However, a range image may be generated based on images obtained via other types of cameras, e.g., based on time-of-flight (ToF) measurements, etc. Further, in some aspects, a range image may be merged with additional sensor data, e.g., with sensor data of one or more radar sensors, etc.

In one or more aspects, a driving operation (such as, for example, any type of safety operation, e.g., a collision avoidance function, a safety distance keeping function, etc.) may be implemented via one or more on-board components of a vehicle. The one or more on-board components of the vehicle may include, for example, a one or more cameras (e.g., at least a front camera), a computer system, etc., in order to detect obstacles (e.g., at least in front of the vehicle) and to trigger an obstacle avoidance function (e.g., braking, etc.) to avoid a collision with the detected obstacles. The one or more on-board components of the vehicle may include, for example, a one or more cameras (e.g., at least a front camera), a computer system, etc., in order to detect another vehicle (e.g., at least in front of the vehicle) and to follow the other vehicle (e.g., autonomously) or at least to keep a predefined safety distance with respect to the other vehicle.

In various aspects, a depth camera (or any other range image device) may be used, for example, aligned at least in forward driving direction to detect during driving when an obstacle may come too close and would cause a collision with the vehicle. In a similar way, at least one depth camera (or any other range image device) may be used, for example, that is aligned in rear driving direction to avoid a collision in the case that an obstacle approaches from this direction.

According to various aspects, one or more sensors and a computing system may be used to implement the functions described herein. The computing system may include, for example, one or more processors, one or more memories, etc. The computing system may be communicatively coupled to the one or more sensors (e.g., of a vehicle) to obtain and analyze sensor data generated by the one or more sensors. According to some aspects, the one or more processors may be configured to generate depth images in real-time from the data received from one or more range imaging sensors and analyze the depth image to find one or more features associated with conditions that represent a risk potential.

Several aspects are described herein exemplarily with reference to a motor vehicle, wherein one more other vehicles represent obstacles in a vicinity of the motor vehicle. However, other types of vehicles may be provided including the same or similar structures and functions as described exemplarily for the motor vehicle. Further, other obstacles may be considered in a similar way as described herein with reference to the other vehicles.

In general, autonomous driving may be configured such that all vehicles are treated equal. While it may make sense to treat every driver identically in some scenarios, there may be certain circumstances that should influence the behavior of an autonomous driving function of a vehicle based on the conditions of other vehicles and/or drivers of other vehicles that are in a vicinity of the vehicle that may use the autonomous driving function.

A human driver may observe one or more other vehicles, objects, persons, etc., in traffic and estimate possible risks based this observation. If, for example, another car is driving in suspicious ways, a human driver might assume that the other driver might be under the influence of drugs or might have other problems. As another example, a car in front of a driver may be damaged and/or held together, for example, by duct tape, wherein, in this case, a human driver may conclude that the damaged car and his driver might have been more frequently in accidents. In general, a human driver may tend to increase the safety distance from any other suspicions car, object, person, etc.

In general, a conventional autonomous driving system may not be able with its artificial intelligence to distinct situations where a risk potential may be present due to the condition of the one or more other vehicles in traffic. According to various aspects, an automatic system is provided that may be used to assist autonomous driving functions. The automatic system may be configured to generate and/or use knowledge of obstacles (e.g., other vehicles, objects, drivers, passengers, pedestrians, etc.) and adapt the own driving style accordingly.

According to various aspects, a detailed analysis of the status and/or shape of other drivers, vehicles, etc., in a surrounding of a vehicle may be performed, e.g., to adjust an autonomous driving behavior of the vehicle. As an example, a greater safety distance may be kept in the case that it is analyzed that a driver of another vehicle uses a smartphone while driving.

Using the obstacle analyzing approach as described herein, autonomous driving may come closer to some of the benefits that have developed in humans over many years. Illustratively, suspicion may be added into the pipeline of artificial intelligence for fully or partially autonomous driving. As a result, one or more autonomous driving functions may be improved, e.g., by adding a risk management based on an analysis of other vehicles that could possibly harm the vehicle that uses the one or more autonomous driving functions.

FIG. 1 illustrates an obstacle analyzer 100 in a schematic view, according to various aspects. The obstacle analyzer 100 may be used as a part of a control system of a vehicle, wherein the control system may control and/or performs one or more partially or completely autonomous driving operations, e.g., one or more partially or completely autonomous safety operation, as example.

According to various aspects, the obstacle analyzer 100 may include one or more sensors 102, one or more processors 104, and one or more memories 106. The one or more processors 104 and the one or more memories 106 may be part of a computing system 120. The computing system 120 may be any suitable computing system implemented within a vehicle, e.g., within a motor vehicle. According to various aspects, the one or more sensors 102 may include any sensor that is suitable for detecting predefined features of an obstacle and/or of a person and/or an object associated with the obstacle. In a traffic situation, the obstacles may be in some cases the other traffic participants, e.g., other vehicles. The one or more sensors 102 may include one or more image sensors to analyze one or more obstacles (e.g., other vehicles) in a vicinity of a vehicle. The one or more sensors 102 may include one or more high-resolution cameras (e.g., having a resolution of more than 1 Megapixel, more than 2 Megapixel, more than 5 Megapixel, or more than 10 Megapixel). The one or more sensors 102 may include one or more high-speed cameras (e.g., delivering more than 50 images per second, more than 100 images per second, or more than 200 images per second). The one or more high-speed cameras may have a high resolution as well. The one or more sensors 102 may include one or more depth cameras. The one or more sensors 102 may include, e.g., in addition to one or more image-based sensors, one or more laser scanners, one or more radar (radio detection and ranging) sensors, one or more lidar (light detection and ranging) sensors, one or more ultrasonic sensors, one or more acoustic sensors, as examples. According to various aspects, any type of sensor may be used that allows obtaining information about the respective obstacles to be considered during analyzing the obstacles and/or control of the vehicle.

According to various aspects, the one or more sensors 102 may be configured to receive (e.g., sense, detect, gather, etc.) obstacle identification information 122 (e.g., obstacle identification data) representing one or more identification features 112 of an obstacle 111 to be analyzed. The one or more identification features 112 may be a license plate number or any other feature or group of features that allows a (substantially) unique identification of the obstacle 111. In some aspects, it may be sufficient if the one or more identification features 112 allow for an unambiguously identification of all obstacles 111 within a predefined area, e.g., within a vicinity of a vehicle that has a safety operation or any other driving operation implemented therein relying on information from the obstacle analyzer 100. In the case that the obstacle 111 is an aircraft, the one or more identification features 112 may include an aircraft registration number of the aircraft. In the case that the obstacle 111 is a watercraft, the one or more identification features 112 may include a hull identification number, as examples.

According to various aspects, the one or more sensors 102 may be further configured to receive obstacle condition information 124 associated with one or more conditions 114 of the obstacle 111. As an example, the obstacle condition information 124 may include information about one or more characteristic features of the obstacle 111 that may be determined and compared with predefined characteristic features.

According to some aspects, in the case that the obstacle 111 is a vehicle that has no driver (e.g., if the obstacle 111 is a fully autonomously driven vehicle), the obstacle condition information 124 may represent characteristic features associated only with the vehicle itself. According to some aspects, in the case that the obstacle 111 is a vehicle that has no driver (e.g., if the obstacle 111 is a fully autonomously driven vehicle) but one or more passengers, the obstacle condition information 124 may represent characteristic features associated with the vehicle and the one or more passengers. According to some aspects, in the case that the obstacle 111 is a vehicle that has no driver (e.g., if the obstacle 111 is a fully autonomously driven vehicle) has a cargo, a trailer, etc., the obstacle condition information 124 may represent characteristic features associated with the vehicle and the cargo, a trailer, etc. According to another aspect, in the case that the obstacle 111 is a vehicle driven by a driver, the obstacle condition information 124 may represent characteristic features associated with the driver of the vehicle and/or with the vehicle itself.

According to various aspects, the characteristic features may be detected by a comparison with predefined characteristic features having a risk value assigned thereto, e.g., included in a database. As an example, sensor data may be checked for predefined characteristic features, patterns, values, etc., and, in the case of a match, presence of the characteristic features with respect to the analyzed obstacle may be assumed.

According to various aspects, the one or more processors 104 may be configured to identify the obstacle 111 to be analyzed based on the received obstacle identification information 122. The one or more processors 104 may be configured to generate an identification value 132. The identification value 132 may be any data structure that can be stored in a computer memory and that uniquely represents a corresponding obstacle 111. In other words, the obstacle 111 to be analyzed may be unambiguously represented by the corresponding identification value 132. The identification value 132 may be anonymized to ensure data security, e.g., to avoid storage of data related to the sphere of personal privacy of the driver.

According to various aspects, the one or more processors 104 may be further configured to determine a rating value 134 representing a risk potential originating from the obstacle 111. In some aspects, the risk potential of an identified obstacle 111 may be determined based on the received obstacle condition information 124. As an example, one or more predefined characteristic features associated with the driver of the vehicle to be analyzed and/or with the vehicle to be analyzed may be used to evaluate the risk potential. The obstacle condition information 124 may be analyzed for presence of predefined characteristic features and—based on the result of the analysis—to deduct a potential risk.

According to various aspects, the one or more processors 104 may be configured to store the rating value 134 assigned to the identification value 132 of the identified obstacle 111 in one or more memories 106. The respective corresponding at least two values for each analyzed obstacle 111 may be stored, for example, in a list 116. As an example, in the case that an obstacle is detected during a safety operation or any other partially of completely autonomous driving operation is carried out, it can be checked via the list 116 whether a rating value 134 is stored for the respective obstacle. If this is the case, the safety operation or any other partially of completely autonomous driving function may be triggered and/or modified. If this is not the case, i.e. if no rating value 134 is stored for the respective obstacle, the safety operation or any other partially of completely autonomous driving function may be carried out in a standard operation mode.

According to various aspects, the obstacle analyzer 100 may be configured to analyze a plurality of obstacles and store for each of the plurality of obstacles a rating value assigned to a corresponding identification value. Illustratively, reference data are stored for various traffic participants that allows for an efficient risk management during a travel of a vehicle that includes a control system (see, for example, FIG. 2) drawing to these reference data to adapt one or more driving functions.

Figure 2:
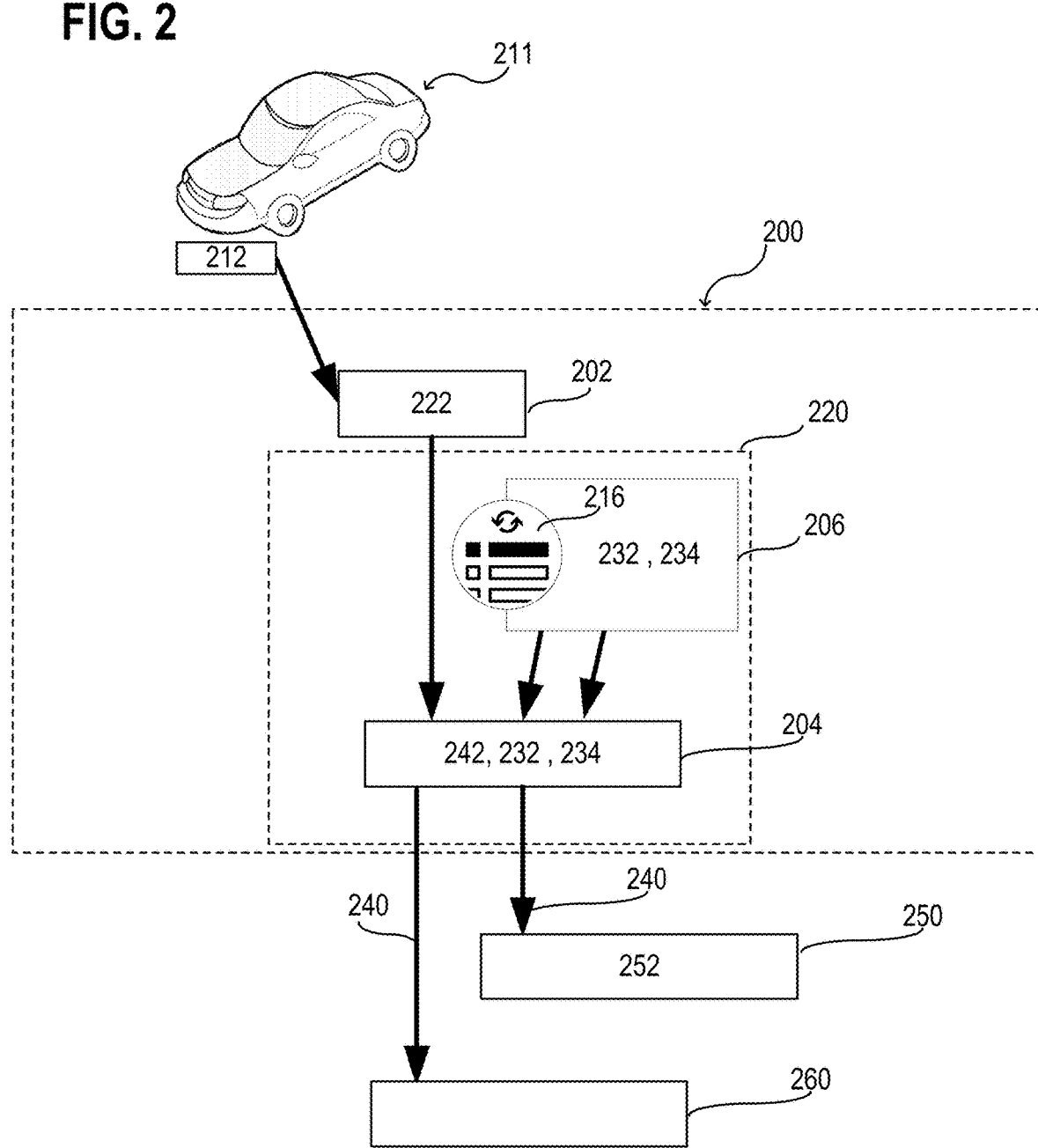
FIG. 2 shows an exemplary vehicle control system, according to some aspects.

FIG. 2 illustrates a vehicle control system 200 in a schematic view, according to various aspects. The vehicle control system 200 may include one or more sensors 202, one or more processors 204, and one or more memories 206. The one or more processors 204 and the one or more memories 206 may be part of a computing system 220. The computing system 220 may be any suitable computing system implemented within a vehicle, e.g., within a motor vehicle. According to various aspects, the one or more sensors 202 may include any sensor suitable for identifying one or more obstacles and may be implemented within a vehicle, e.g., within a motor vehicle.

Figure 3:
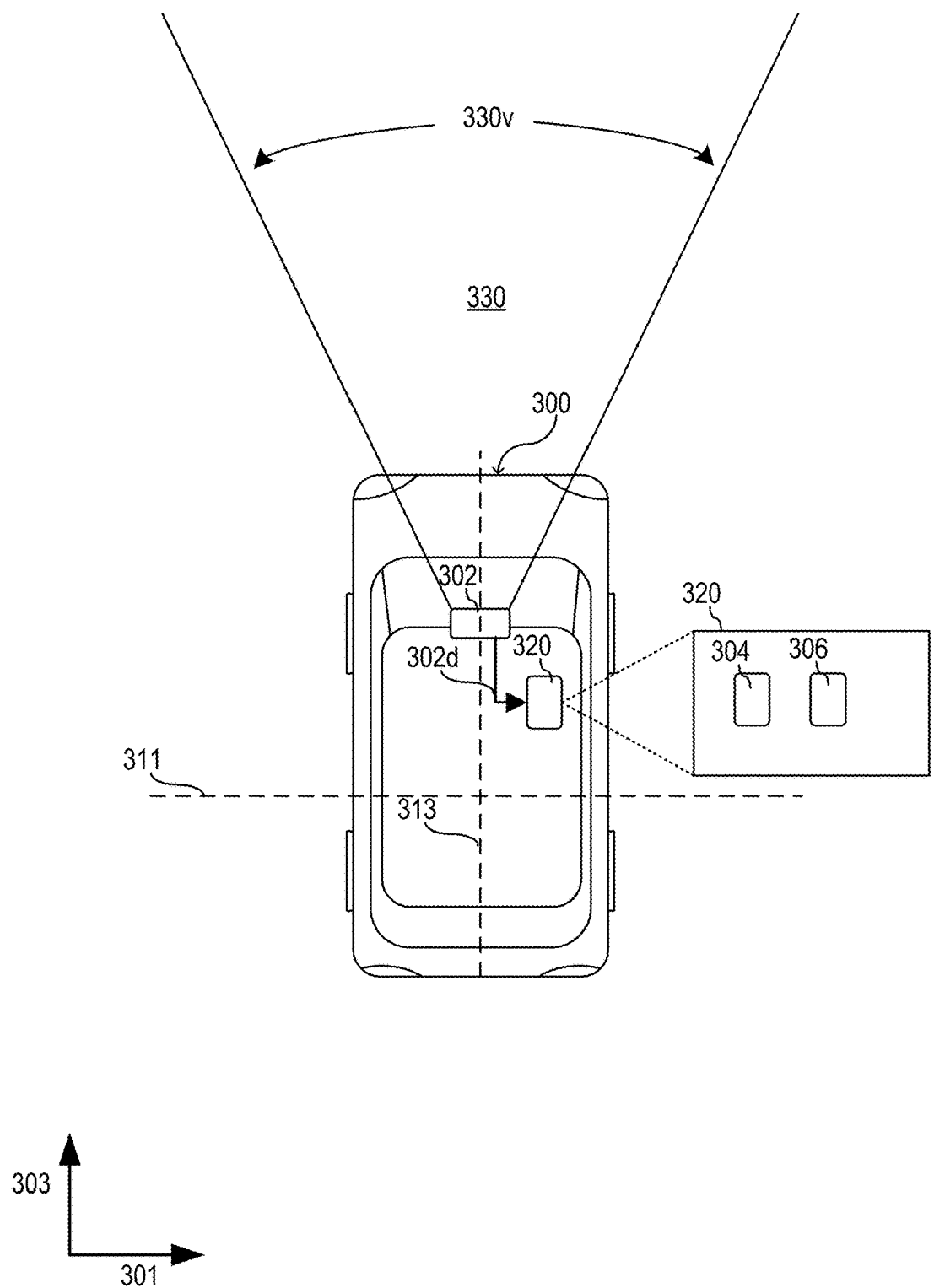
FIG. 3 shows an exemplary vehicle including at least one of an obstacle analyzer or a vehicle control system, according to some aspects.

In some aspects, the obstacle analyzer 100 and the vehicle control system 200 may be part of the same vehicle (see, for example, FIG. 3). In this case, the very same computing system may be used to implement the functions of both the obstacle analyzer 100 and the vehicle control system 200. Alternatively, the obstacle analyzer 100 may be not part of the vehicle that includes the vehicle control system 200; in this case, data may be send from the obstacle analyzer 100 to the vehicle control system 200.

According to various aspects, the one or more sensors 202 of the vehicle control system 200 may be configured to receive obstacle identification information 222 representing one or more identification features 212 of an obstacle 211. The obstacle 211 may be located in a vicinity of a vehicle (see, for example, FIG. 3) that includes the vehicle control system 200. The obstacle 211 may be, for example, another traffic participant, e.g., another vehicle (in particular, another motor vehicle).

According to various aspects, the one or more memories 206 of the vehicle control system 200 may include a plurality of reference identification values 232 and a plurality of rating values 234 stored therein. Each of the plurality of reference identification values 232 represents one (e.g., previously) identified obstacle 111 having one of the plurality of rating values 234 assigned thereto. As an example, the one or more memories 206 of the vehicle control system 200 may include a list 216, wherein respectively two corresponding reference values (i.e. an identification value and a rating value) are stored representing each of a plurality of previously analyzed obstacles, see, for example, FIG. 1. In some aspects, the reference identification values 232 and the corresponding rating values 234 may be generated by an obstacle analyzer 100, as described herein. However, as an alternative, the reference identification values 232 and the corresponding rating values 234 may be generated in any other suitable way.

According to various aspects, the one or more processors 204 of the vehicle control system 200 may be configured to identify the obstacle 211 based on the received obstacle identification information 222 and generate an identification value 242 associated with the obstacle 211. The one or more processors 204 of the vehicle control system 200 may be further configured to compare the identification value 242 with one or more (e.g., all) of the plurality of reference identification values 232 that are, for example, stored in the one or more memories 206 of the vehicle control system 200. In the case that the identification value 242 matches a reference identification value 232v of the plurality of reference identification values 232, the one or more processors 204 of the vehicle control system 200 may be configure to execute at least one of a triggering or a modification of a driving operation based on a respective rating value 234v of the plurality of rating values 234 assigned to the matching reference identification value 232v.

As an example, the vehicle control system 200 may output a control signal 240 to any other device performing a driving operation and/or the one or more processors 204 of the vehicle control system 200 may be configured to perform the driving operation. As an example, the driving operation may include an autonomous cruise control (ACC) 250 that may be also referred to as adaptive cruise control, traffic-aware cruise control, automatic distance control, etc., which may automatically adjust the speed of the controlled vehicle to maintain a predefined (safety) distance 252 from another vehicles (e.g., from a vehicle driving ahead of the controlled vehicle). In some aspects, the one or more processors 204 of the vehicle control system 200 may be configured to modify 240 (or at least instruct a modification) of the predefined (safety) distance 252 of the autonomous cruise control 250.

As another example, the driving operation may include an autonomous overtaking control (AOC) 260, which may automatically control an overtake maneuver that allows the controlled vehicle to overtake another vehicle (e.g., to overtake a vehicle driving ahead of the controlled vehicle). In some aspects, the one or more processors 204 of the vehicle control system 200 may be configured to trigger a start of the overtake maneuver. The autonomous overtaking control may further evaluate one or more additional properties (e.g., a relative speed of the vehicle to overtake relative to the controlled vehicle, a distance to a nearest curve, presence of sufficient free space, etc.) to ensure a safe overtake maneuver.

FIG. 3 illustrates a vehicle 300, e.g., a motor vehicle, in a schematic view, according to various aspects. The vehicle 300 may be a car, a truck, a van, a bus, or any other vehicle driving on the ground. In some aspects, the vehicle 300 may define a longitudinal axis 313. The longitudinal axis 313 may be associated with a forward driving direction (e.g., illustratively in direction 303 as illustrated in FIG. 3) and/or a rear driving direction (e.g., illustratively opposite to the direction 303). Further, the vehicle 300 may define a lateral axis 311 perpendicular to the longitudinal axis 313. According to various aspects, the vehicle 300 may include one or more sensors 302, in some aspects one or more image sensors (e.g., one or more cameras, e.g., one or more depth cameras, etc.). Further, the vehicle 300 may include one or more processors 304 and one or more memories 306. The one or more processors 304 and the one or more memories 306 may be part of a computing system 320, e.g., of a head unit or a central computer of the vehicle 300. In some aspects, the computing system 320 of the vehicle 300 may be configured to implement the functions of the obstacle analyzer 100 and/or the vehicle control system 200, as described herein.

The one or more sensors 302 of the vehicle 300 may be configured to provide sensor data 302d (e.g., image data) to the one or more processors 304 of the vehicle 300. The sensor data 302d may represent, for example, an image (also referred to as sensor image or camera image) of a vicinity 330 of the vehicle 300. Illustratively, the sensor image may correspond to a field of vision 330v (also referred to as field of view) of the one or more sensors 302. According to various aspects, the one or more sensors 302 may be configured such that the field of vision 330v has a lateral dimension (e.g., in a horizontal plane parallel to the lateral axis 311 and the longitudinal axis 313) and a vertical dimension (e.g., in a vertical plane perpendicular to the lateral axis 311 and parallel to the longitudinal axis 313). The one or more sensors 302 of the vehicle 300 may be able to receive information (e.g., obstacle identification information 122, 222 and/or obstacle condition information 124) associated with one or more objects (e.g., one or more obstacles, e.g., one or more other vehicles, e.g., one or more pedestrians, etc.) in the vicinity 330 of the vehicle 300. In some aspects, the one or more sensors 302 may be configured to provide a 360° field of view at least in the horizontal plane.

According to various aspects, the one or more sensors 302 of the vehicle 300 may include, for example, one or more cameras (e.g., one or more depth cameras, one or more stereo cameras, etc.), one or more ultrasonic sensors, one or more radar (radio detection and ranging) sensors, one or more lidar (light detection and ranging) sensors, etc. The one or more sensors 302 of the vehicle 300 may include, for example, any other suitable sensor that allows a detection of an object and corresponding characteristic features associated with the object.

According to various aspects, the one or more sensors 302 of the vehicle 300, the one or more processors 304 of the vehicle 300, and the one or more memories 306 of the vehicle 300 described herein may implement the vehicle control system 200 and/or the obstacle analyzer 100. Alternatively, the obstacle analyzer 100 may be implemented as an additional device and/or the vehicle control system 200 may be implemented as an additional device. According to various aspects, the functions of the obstacle analyzer 100 may be implemented in a decentralized system such that the list 116, 216 may be generated from data of a plurality of the sensors or sensor devices located in various different locations. As an example, all traffic participants located within a pre-defined area may share the same list 116, 216.

The size of the pre-defined area may not be limited to the surrounding of the vehicle 300. As an example, a plurality of obstacle analyzers may be used to generate a global list including all analyzed traffic participants. The obstacle analyzers 100 may be integrated into vehicles, as an example. However, the obstacle analyzers 100 may be alternatively mounted at any suitable infrastructure (e.g., at a traffic light, a bridge, a traffic sign, etc.). The global list may be provided to the respective vehicle control system 200 via any type of data transmission, e.g., based on a wireless communication.

FIG. 4 illustrates a traffic situation 400 in an exemplary schematic view, according to various aspects. In this exemplary traffic situation 400, a first vehicle 402 may drive along a road 400r and may have other vehicles 411 (that are regarded as obstacles) in its vicinity. In some aspects, the first vehicle 402 may include (or may be communicatively coupled with) an obstacle analyzer 100 and/or a vehicle control system 200. As a result, the first vehicle 402 may be able to analyze the other vehicles 411 and adapt its driving control system to a possible risk originating from one or more of the other vehicles 411. As an example, if a second vehicle 411-1 of the other vehicles 411 is identified by the obstacle analyzer 100 and has a rating value that represents a high potential risk, the first vehicle 402 may either be controlled to increase distance to this second vehicle 411-1 or to overtake the second vehicle 411-1 provided that the traffic situation allows an overtake maneuver.

Figure 5:
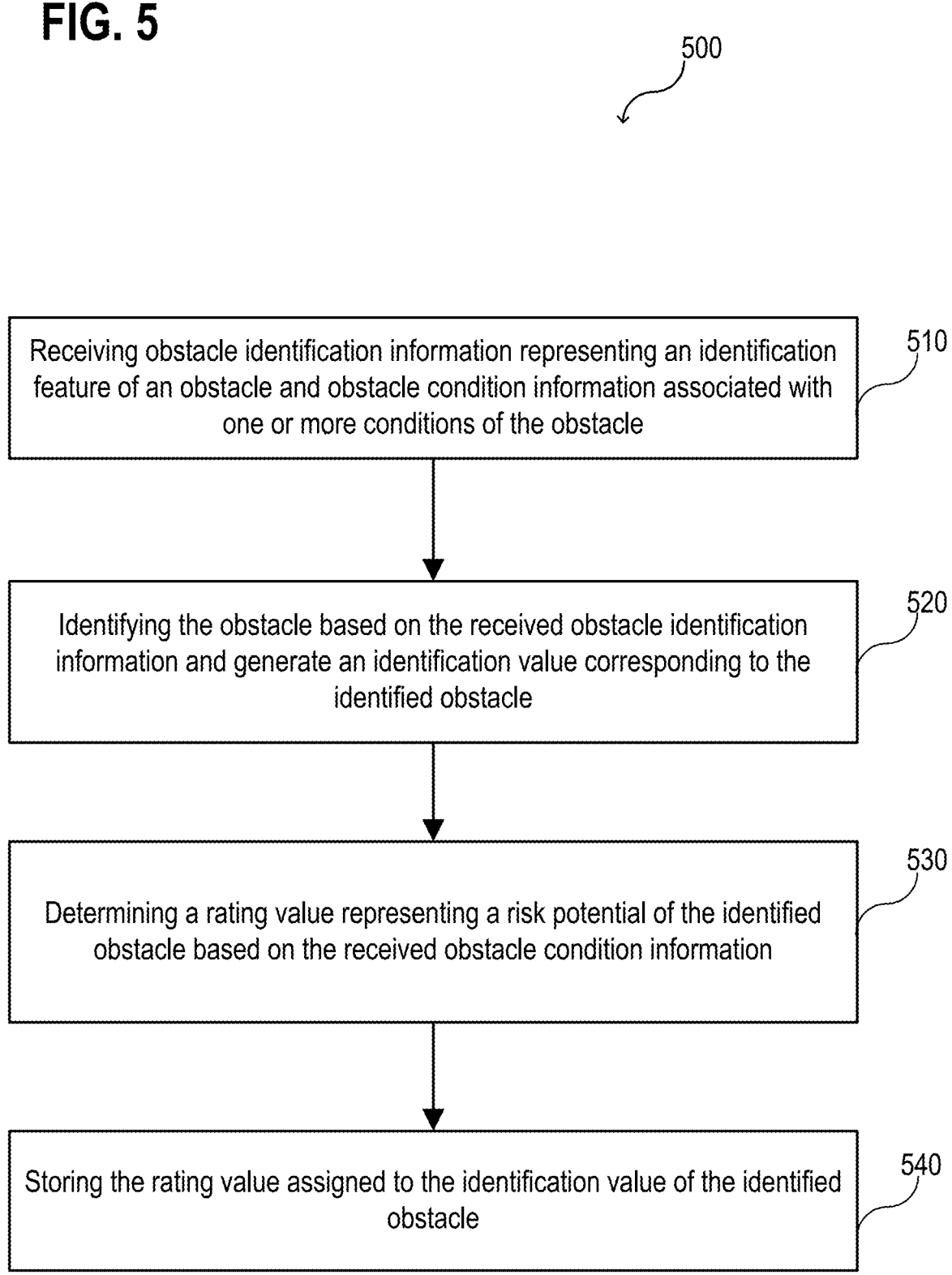
FIG. 5 shows an exemplary flow diagram of a method for analyzing an obstacle, according to some aspects.

FIG. 5 shows a schematic flow diagram of a method 500 for analyzing one or more obstacles, according to various aspects. The method 500 may include, in 510, receiving obstacle identification information representing an identification feature of an obstacle and obstacle condition information associated with one or more conditions of the obstacle; in 520, identifying the obstacle based on the received obstacle identification information and generate an identification value corresponding to the identified obstacle; in 530, determining a rating value representing a risk potential of the identified obstacle based on the received obstacle condition information; and, in 540, storing the rating value assigned to the identification value of the identified obstacle. According to various aspects, the method 500 may be carried out in accordance with one or more functions as described herein with respect to the obstacle analyzer 100.

According to various aspects, receiving obstacle identification information may include generating a sensor image of a vicinity of a vehicle and determining the one or more characteristic features of the obstacles from the sensor image.

FIG. 6 shows a schematic flow diagram of a method 600 for controlling a vehicle, according to various aspects. The method 600 may include, in 610, receiving obstacle identification information representing an identification feature of an obstacle in a vicinity of a vehicle; in 620, identifying the obstacle based on the received obstacle identification information and generating an identification value corresponding to the obstacle; in 630, comparing the identification value with one or more reference identification values of a plurality of reference identification values, the plurality of reference identification values representing a plurality of previously identified obstacles, each of the plurality of reference identification values having a rating value assigned thereto; and, in 640, in the case that the identification value matches a reference identification value of the plurality of reference identification values, executing at least one of a triggering or a modification of a driving operation based on the rating value assigned to the reference identification value. According to various aspects, the method 600 may be carried out in accordance with one or more functions as described herein with respect to the vehicle control system 200.

In the following, various aspects are described in more detail. The configurations and functions described below may be implemented in the obstacle analyzer 100 and/or the vehicle control system 200 as described above. The configurations and functions described below may be part of the method 500 or method 600 as described above.

Various aspects are based on an observation of one or more components regarding traffic in a vicinity of a vehicle. The one or more components may include: inherent properties of nearby vehicles (e.g., make & model, tire tread, etc.), a driver analysis including an indirect analysis via observations of patterns in the vehicle behavior and/or a direct analysis based on a visual observation of the driver (e.g., of the drivers face and/or body), cargo and/or passenger loading, etc.

In some cases, predefined properties may not be fully accessible due to a limited field of view of the respective sensors that are used for the analysis, e.g., the obstacles may be analyzed from the first vehicles 402 point of view, as illustrated in FIG. 4. In this case, it may be difficult to estimate whether the engine hood of the second vehicle 411-1 driving in front of the first vehicle 402 has any damages or other characteristic features. Therefore, in some aspects, one or more communication mechanisms (e.g., vehicle to vehicle (V2V), infrastructure to vehicle (X2V)), etc.) may be used where other vehicles or vision-based systems are able to report data (e.g., including obstacle identification information and/or obstacle condition information) to the first vehicle 402. Via the one or more communication mechanisms, one or more obstacles (e.g., other vehicles that may be relevant for the traffic situation) may be analyzed that may be not (or not completely) visible from the position of the first vehicle 402 that may use the obtained information. With advances in V2V and V2X communication, the analysis of the one or more obstacles may become more and more efficient.

According to various aspects, an analysis of at least one other vehicle 411 around the first vehicle 402 may be performed. As mentioned above, information reported from other entities may be combined for the analysis, if available and desired. To assess the properties of another vehicle 411, it may be identified which exact make and model the other vehicle 411 is. Using, for example, object recognition with trained patterns on existing and known cars may provide this.

Further, through vision-based methods and information sent to the first vehicle from other vehicles, key properties of the other vehicle may be estimated. Key properties may be at least one of: tire status, tread depth (New or worn out?), proper tire type for the prevailing weather conditions (e.g., if there are snowy roads, is the other vehicle equipped with winter tires, since summer tires would have much worse traction and increased stopping distance), snow chains, etc.

Figure 7A:
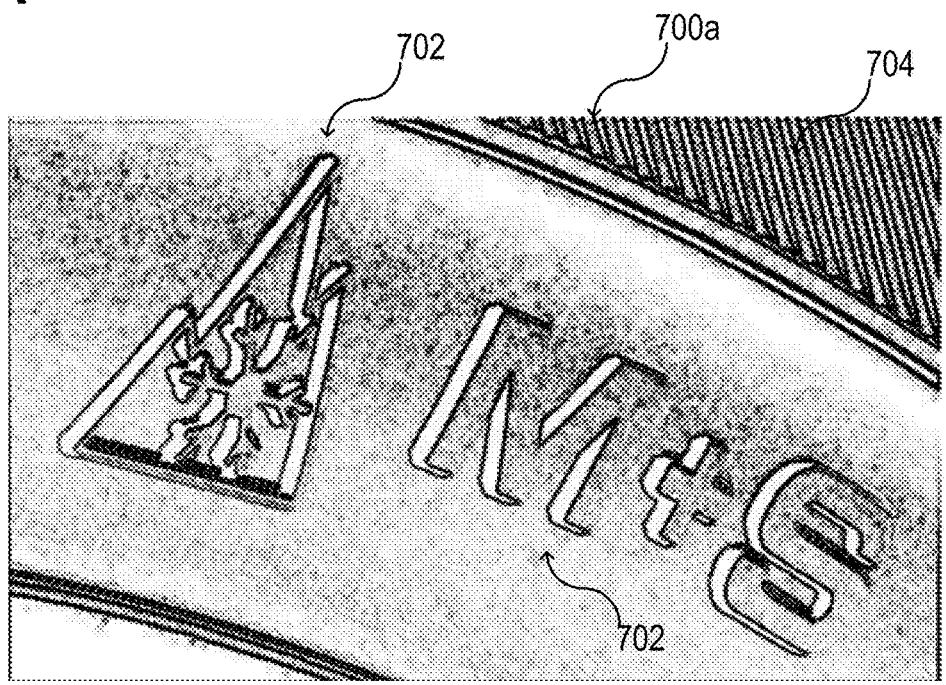
FIG. 7A, FIG. 7B and FIG. 7C show exemplarily various characteristic features related to tires of an analyzed vehicle, according to some aspects.

FIG. 7A shows exemplarily an image 700a of a part of a winter tire including one or more characteristic features. As an example, a winter tire may be detected by analyzing the image 700, e.g., by check for a presence of one or more characteristic features, as for example a pictogram 702 and/or a tread pattern 704 that may be typical for winter tires.

Figure 7B:
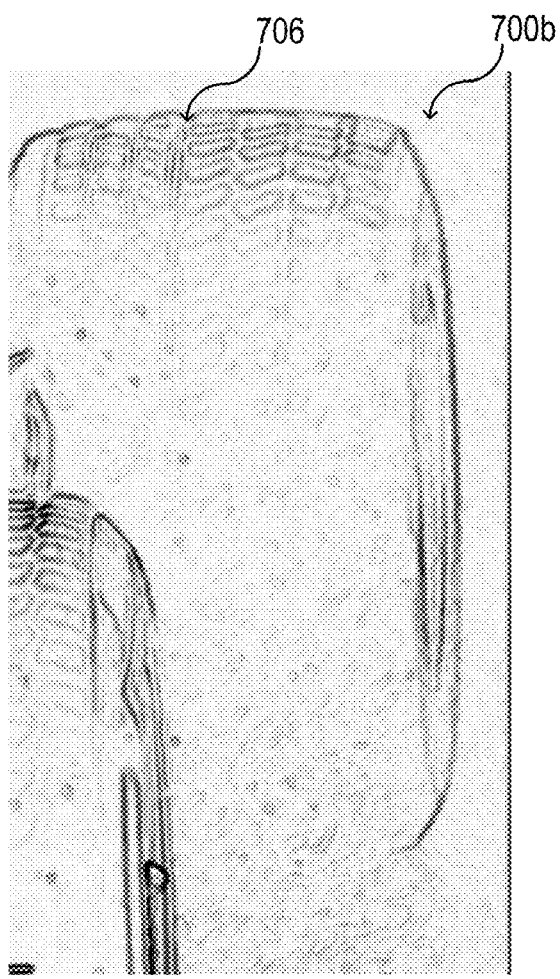

FIG. 7B shows exemplarily an image 700b of a part of a tire of a car including one or more characteristic features. As an example, a tread depth of the tire may be estimated by analyzing the image 700b, e.g., by check for a presence of one or more characteristic features, as for example a tread pattern 706 that may be typical for new tires and/or worn out tires.

Figure 7C:
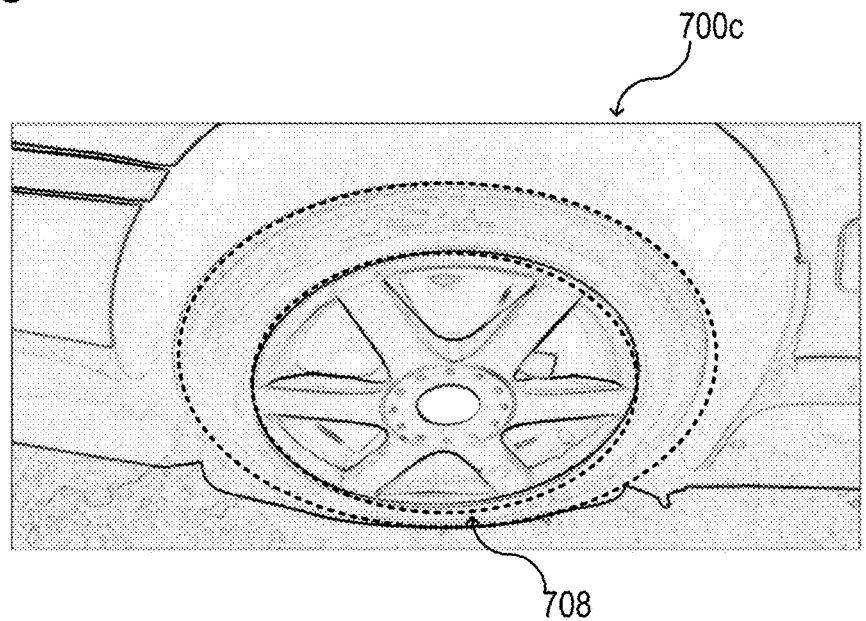

FIG. 7C shows exemplarily an image 700c of a wheel of a car including one or more characteristic features. As an example, a shape of the tire may be estimated by analyzing the image 700c, e.g., via determining presence of one or more characteristic features, as for example a pattern 708 representing a flat tire, i.e. a tire with not sufficient air pressure. In some aspects, a low profile rim may be detected. Since determining a flat tire may result in too many false positives for low profile rims, the determination of a flat tire may be discarded in this case.

Figure 8:
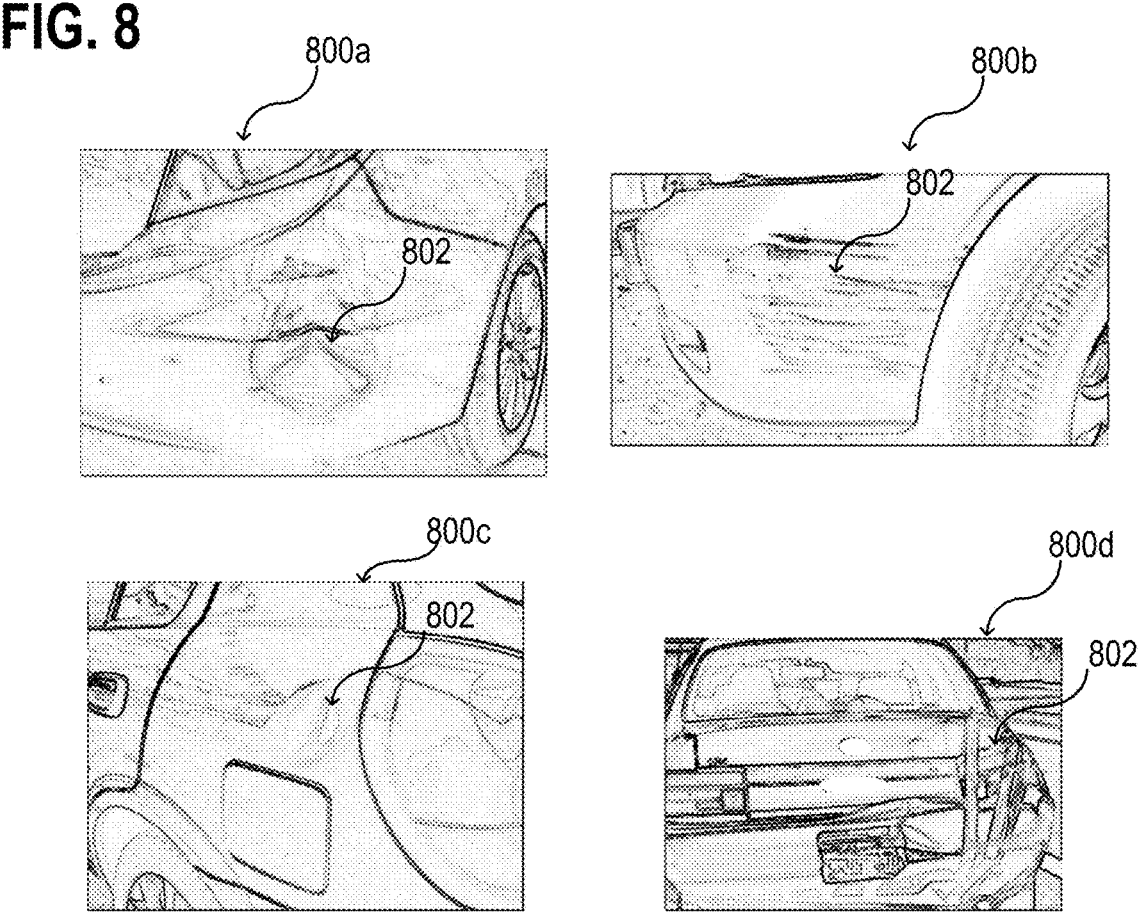
FIG. 8 shows various characteristic features related to damages of an analyzed vehicle, according to some aspects.

As show exemplarily above, various characteristic features may be detected vision-based. As another example, one or more damages of a vehicle may be detected, e.g., vision-based and/or assisted by using predefined models of the vehicles for comparison. In some aspects, the condition of the outer skin of the other vehicle may be determined, as exemplarily illustrated in FIG. 8. FIG. 8 illustrates various images 800a, 800b, 800c, 800d of another vehicle including one or more characteristic features 802 representing damages. As examples, it may be determined whether dents or scrapes are present at the other vehicle, whether items of the other vehicle are held together through duct tape, or whether other visible damages are present. Dents, scrapes, and duct tape may be detected through object recognition, for example.

According to various aspects, a more sophisticated method may involve analyzing depth/stereo images from depth/stereo cameras.

Figure 9:
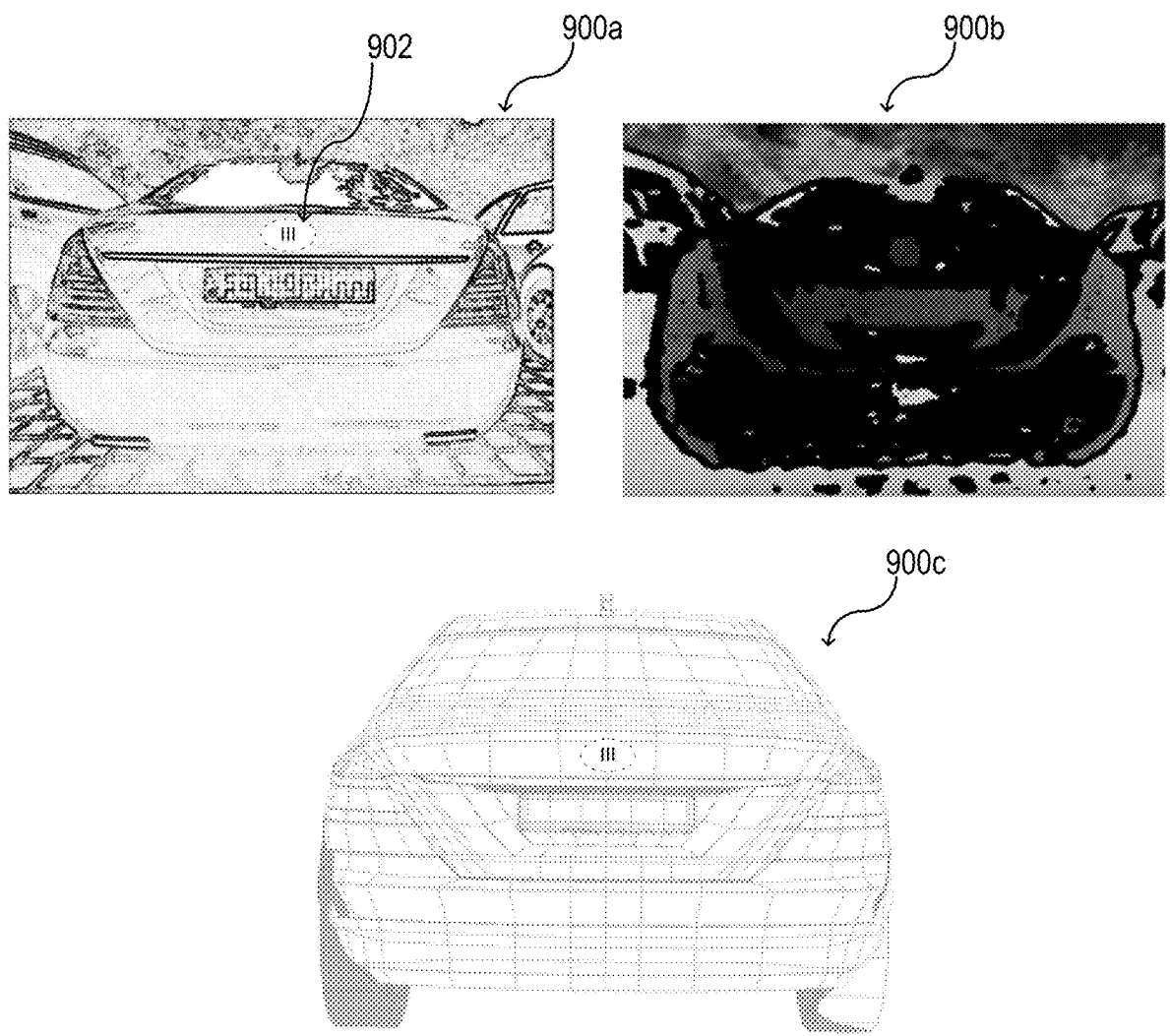
FIG. 9 shows exemplarily an image of a car, a depth image of a car, and a 3D reference model of a car, according to some aspects.

As an example, using depth/stereo images, a 3D model of the other vehicle can be reconstructed on the fly and may be compared to reference models. One example of using depth and gray scale information is illustrated in FIG. 9. FIG. 9 shows an image 900a of a car, a depth image 900b of a car, and a 3D reference model 900c to analyze make and model based on a comparison of the image data with the reference model 900c. As another example, make and model specific features may be detected from the image 900a.

According to various aspects, one or more car properties may be analyzed based on make and model. In some aspects, perspective distortions that may be present in the images may be removed (in other words compensated) through calculations. In the case that, for example, the correct tire type in reasonable condition is detected, the car's properties (e.g.: How many meters to stop when fully braking in dry street conditions? How long to stop in rainy conditions? How fast can the other car accelerate?) at the current weather may be estimated based on knowledge about make and model of the car. If a human driver is assumed for the other vehicle, e.g., the other car does not exist with systems for autonomous driving, an average reaction time of human drivers may be considered as well for such estimations.

In some aspects, a make and, e.g. optionally, a model of a vehicle may be visually identified due to the distinctive taillights, front lights, or other characteristic features. However, it may be also possible to read the make and model badging 902 that may be usually located on the tail lid of a vehicle.

According to various aspects, a bumper height of the other vehicle may be analyzed. It may be helpful, to avoid especially a decapitation due to a collision with a rear-end of a larger vehicle (e.g., a truck) or of a lifted pick-up. According to various aspects, it may be checked whether a car has been significantly modified from stock. Therefore, a car to be analyzed may be compared to a corresponding default car model. As an example, a difference in a rim size, a tweaked spoiler, a suspension slammed to ground, etc., may be noticed.

According to various aspects, stickers on a car may be detected and its content may be analyzed. Some car owners may present their opinion in the form of stickers on the back of the car. While this might not be a 100% sure indicator as someone else might be driving the car, it may be still considered during a risk potential estimation what type of stickers may be attached to a car. The content of various car stickers that might indicate that we should keep a larger safety distance may be considered as input data for the analysis. As an example, a sticker having, for example, the content "driving school", "student driver", "long vehicle", "heavy load", "taxi", etc., may be actually designed to warn or inform other traffic members.

According to various aspects, a driver profile of one or more other vehicle may be analyzed. Besides an analysis of the one or more other vehicles itself, an insight may be obtained from generating a temporary profile of a driver of another vehicle. Ethical and moral implications of generating a driver profile may be considered. As an example, society expects equal treatment of every person without regard to physical appearances, and this may be acknowledged in the obstacle analyzation described herein. Any discrimination is avoided in which someone might have fewer rights than another person based on their appearance and the like. However, taking, for example, a driver's age into account may be appropriate as it may be often a proxy for both behind-the-wheel driving experience as well as health conditions that adversely affect reflexes and driving ability. While this is a very philosophical topic and multiple answers might be correct, it may be accepted by the society at least in some countries that creating a temporary driver profile to adjust autonomous driving can be useful.

As an example, the functions described herein may be configured in such a way, that no discrimination occurs against any person based on such a generated driver profile, since none of the driver's rights are limited due to the proposed use of such profile. As an example, more safety distance may be kept to possibly avoid potential accidents, therefore lives may be saved. However, none of the functions implemented in the obstacle analyzer 100 or the vehicle control system 200 may take away anyone's right to turn when it is given; and no driver is limited in his freedom by taking precautions. According to various aspects, the driver's profile may be generated and stored only temporarily and anonymously. Once the other vehicle is, for example, far enough away, and/or a predefined time is passed, the stored data may be discarded.

The analysis of the driver's profile may include one or more of the following aspects. According to various aspects, any available visual information about a driver of a vehicle may be used to generate a driver's profile, or in other words, to estimate a risk potential originated from the behavior or status of the driver. The information may be obtained either from one or more sensors (e.g., cameras) of the first vehicle 402 (see, for example, FIG. 4) or form other cars or street cameras. The following characteristics of the other driver may be observed:

A driver's mouth may indicate whether the driver is engaged in a conversation or not.

A driver may hold a cell phone or a tablet.

A Driver's head may turns wildly/repeatedly or to the side for prolonged period of time which may indicate that the driver may not pay attention to the road ahead.

A driver's head may bounce, e.g., to loud music detected through one or more microphones.

Other objects may be in the driver's hand, such as a drink, food, etc.

Elderly driver may statistically tend to have slower reflexes and less acute vision. Conversely, teen drivers may be statistically the most accident-prone drivers (e.g., as reflected in insurance rates at least in some countries).

Further, in terms of the driving behavior of the driver, following patterns may be observed:

Repeated lane changes, weaving through traffic; every lane change carries an additional risk.

Tailgating.

Cutting off of driver during lane change.

Abrupt application of brakes or acceleration.

Failure to use turn signals.

Over-revving engine.

Squealing tires.

Drifting to outside lane or to edge of lane.

Swerving repeatedly inside the own lane.

As another example, cargo & passengers of the other vehicle may be observed. As an example, following situations may be observed:

Children may distract the driver.

The vehicle may be heavily loaded. This may detract from standard performance both in terms of braking ability and emergency maneuvers.

The vehicle may tow a trailer.

The vehicle may have unsecured or poorly secured objects in its pickup bed or hatch/trunk.

Passengers may throw objects out of the vehicle.

A passenger or the driver may lean out the window.

A passenger or the driver may shout out the window.

As another example, there may be a situation where a driver or passenger of a vehicle is pointing a weapon (e.g. a gun) out of a window of the vehicle. This may be associated with a specific safety operation, e.g. an emergency stop.

In general, according to various aspects, any typical situation or statistical information that may increase a risk potential associated with another vehicle may be mapped to specific features that can be looked for via one or more suitable sensors. If a vehicle's profile, driver's profile, passenger's profile, etc., is generated and/or evaluated, a risk value may be determined that represents the sum of all risks determined from the profiles.

Many of the mentioned issues might raise concern that guides the vehicle to keep a larger safety distance than usual. In the opposite way, the vehicle might in some instances keep a lower safety distance than usual, but still within safe parameters to assure that the vehicle can perform a full stop in case of unpredictable events. In other cases, reactions might include yielding the right of way. For example, two cars may turn left on opposite street sides, and one car has to behave defensively and give up the right to take the left turn, so the other vehicle can pass and the vehicle can pass afterwards. Detecting that the other vehicle has, for example, a less experienced driver might play a role in yielding the right of way to cope with uncertainty and risk.

Similarly, it may be useful to not be followed by a high risk driver/vehicle. One option may be to increase speed to widen the gap. However, if speed limits or traffic conditions preclude this or if the following vehicle matches our speed, other options may be considered, such as changing lanes if there are multiple travel lanes, and/or letting a trailing vehicle pass; when the vehicle is behind the other vehicle, the vehicle can control the safety buffer. Just like when climbing a mountain, someone may always want to keep the inexperienced persons below you. By exercising these defensive driving techniques, the probability of accidents may be decreased.

In general, there may be a need for a greater following distance under high-risk situations (such as the other driver texting, etc.) since the usually planned braking distance may not be sufficient in some scenarios, e.g. in the case of an accident, etc. As an example, a conventional braking distance models may be insufficient in the case that another vehicle in front of a vehicle slams into a parked vehicle due to distraction. In this case, there will be, for example, no brake lights and the braking distance may be effectively zero regardless of the make and model. In some aspects, such high-risk situations are detected in advance; and the following distances may be increased to a sufficient distance.

To determine whether the vehicle may decide to hold a larger driving distance, several other factors may be taken into account, which may be relevant, e.g.: weather condition (rain, fog, dry, snowy . . . ), road conditions, health of the vehicle (the first vehicle 402), tire status of the vehicle (the first vehicle 402), etc.

Figure 10A:
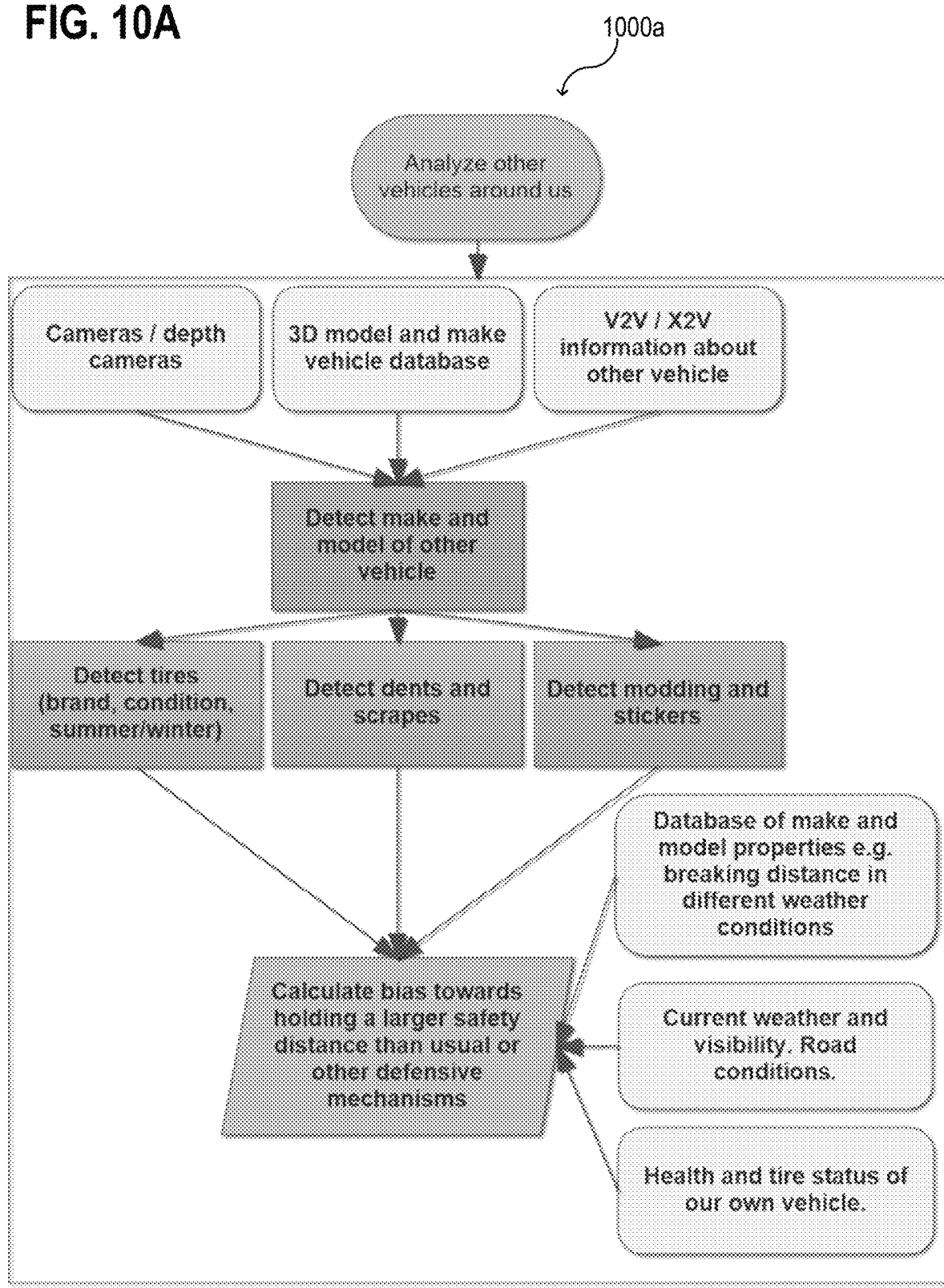
FIG. 10A, FIG. 10B and FIG. 10C show exemplarily various flow diagram of analyzing a vehicle, a driver of a vehicle, and a passenger and/or cargo of a vehicle, according to some aspects.
Figure 10B:
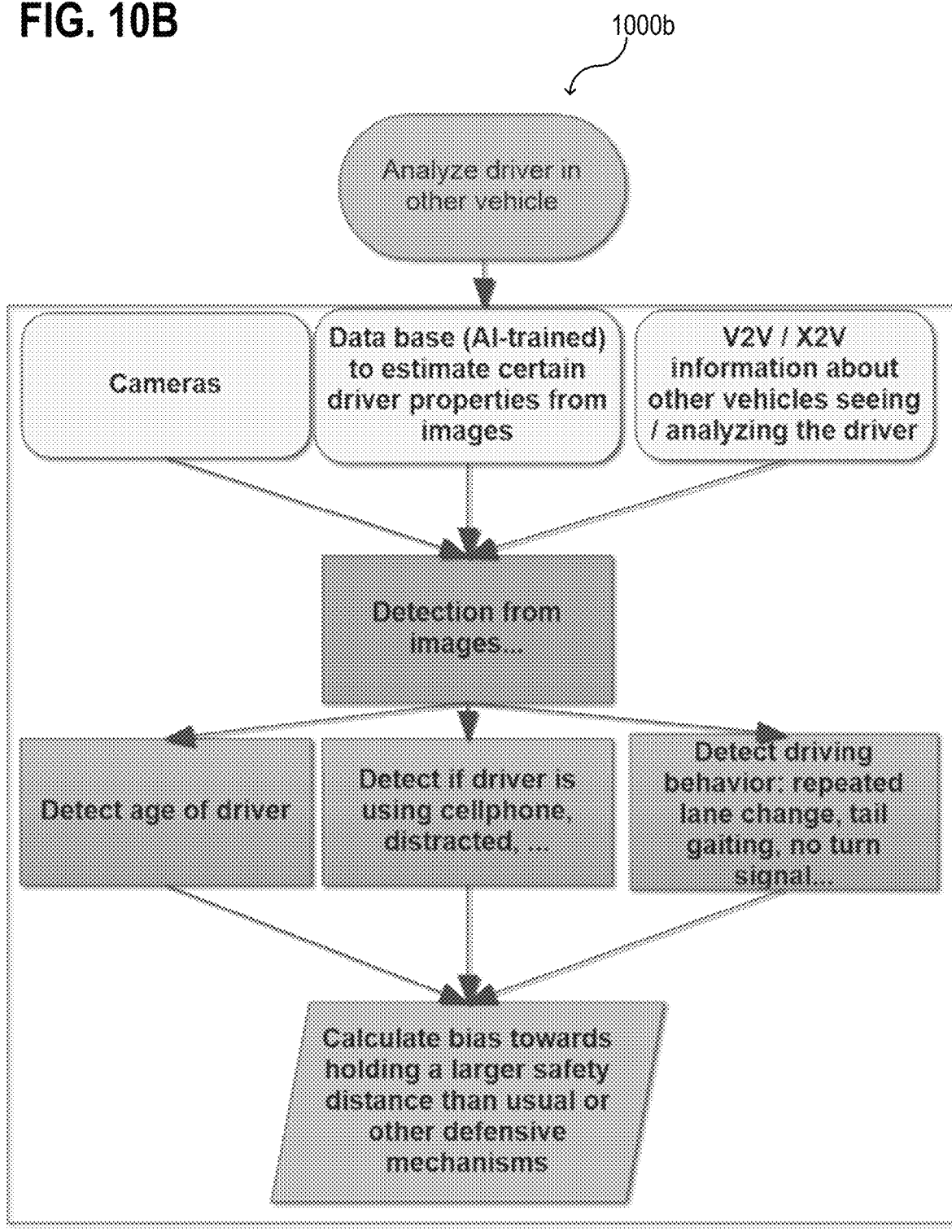
Figure 10C:
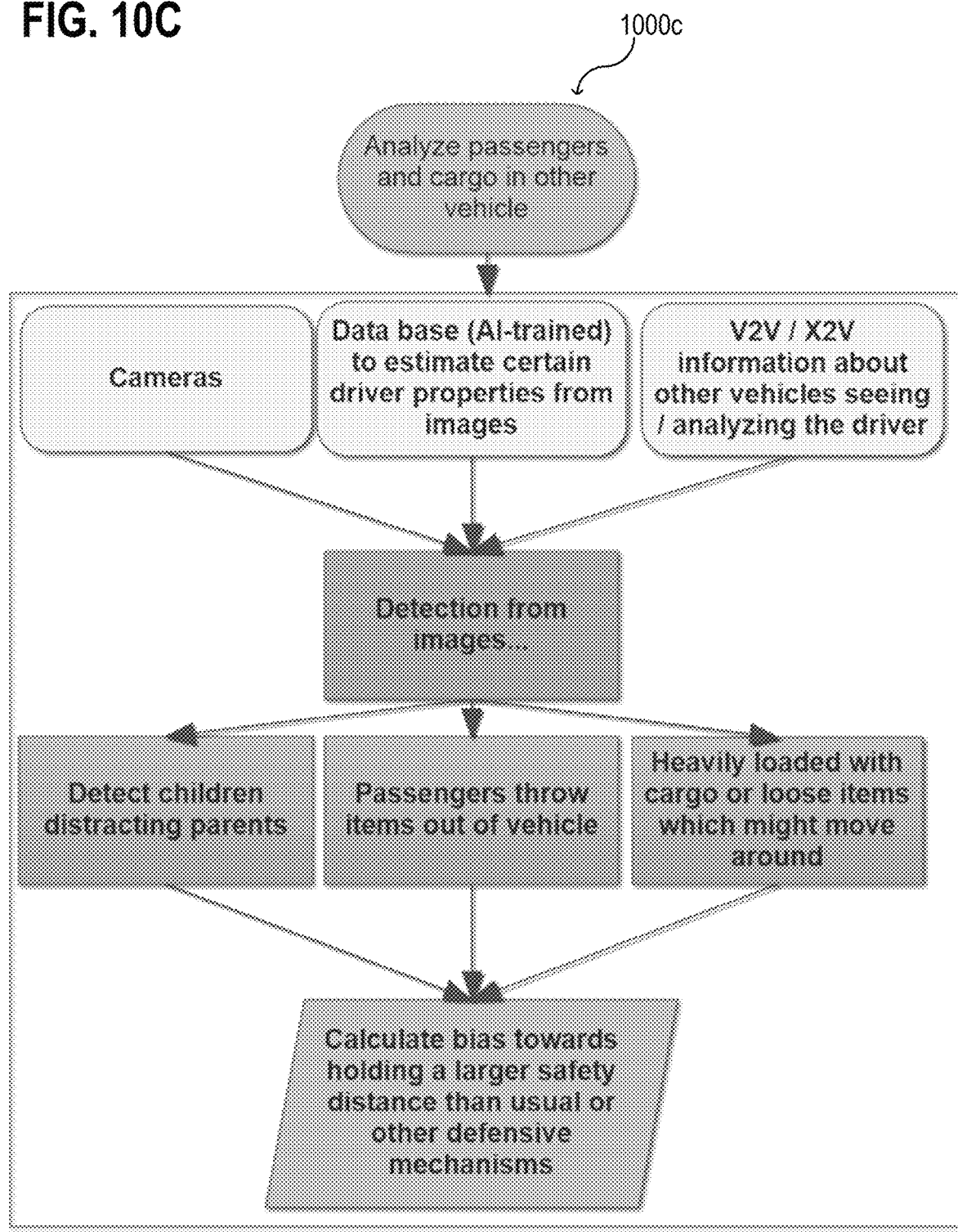

FIG. 10A, FIG. 10B, and FIG. 10C show exemplarily various flow diagrams related to one or more aspects described herein. As a first example, other vehicles 411 around a first vehicle 402 (also referred to as or the vehicle that contains the obstacle analyzer 100 and/or the vehicle control system 200) may be analyzed 1000a, as illustrated in FIG. 10A in a schematic view. As a second example, drivers of other vehicles 411 around a first vehicle 402 may be analyzed 1000b, as illustrated in FIG. 10B in a schematic view. As a third example, passengers and/or cargo in other vehicles 411 around a first vehicle 402 may be analyzed 1000c, as illustrated in FIG. 10C in a schematic view. It has to be understood that various functions illustrated in the figures may be optional features.

In the following, various details are provided referring a possible calculation of the rating value or a value that represents a risk potential originated from another vehicle.

Figure 11:
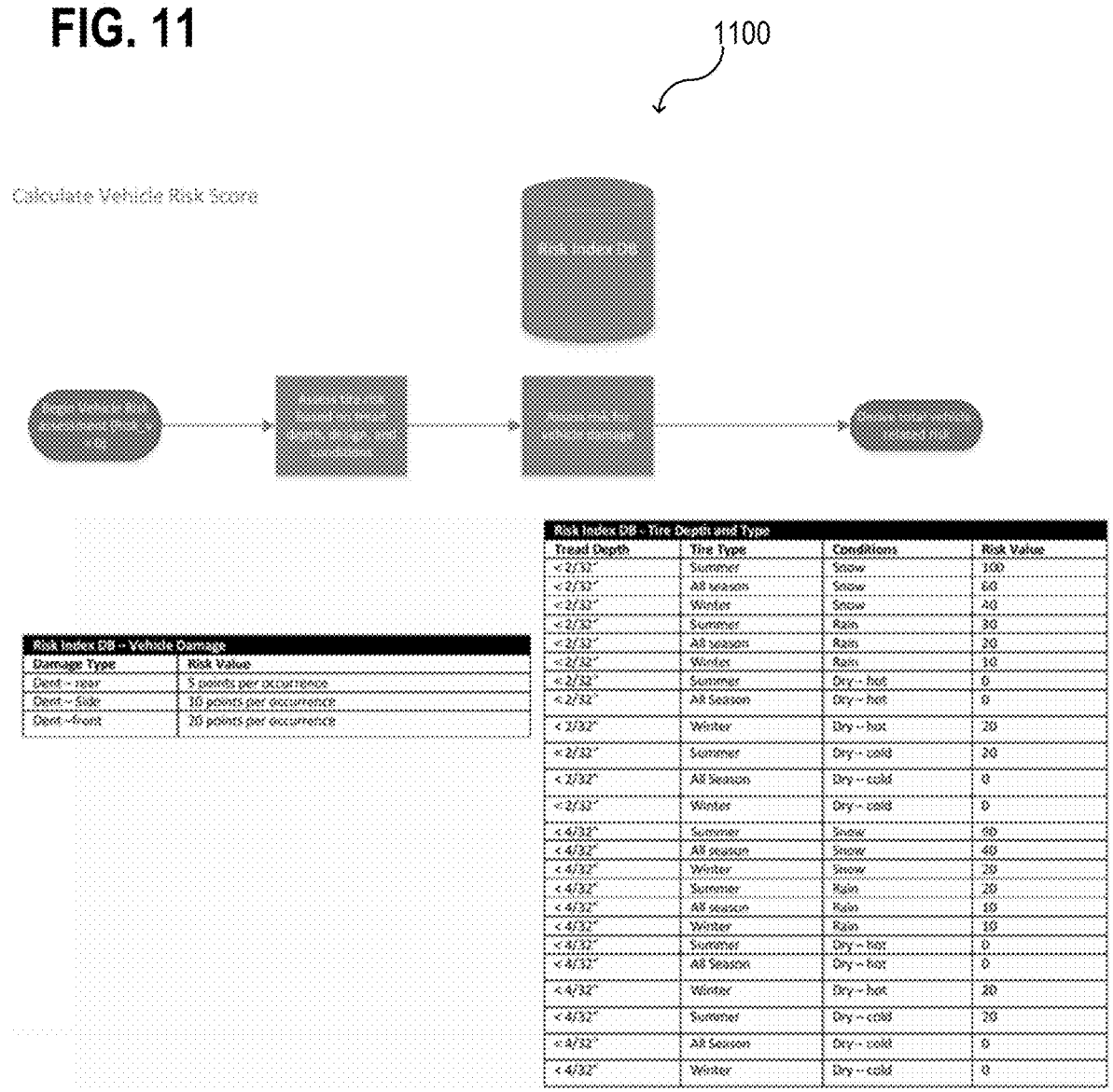
FIG. 11 shows exemplarily a flow diagram of calculating a vehicle risk value, according to some aspects.
Figure 12:
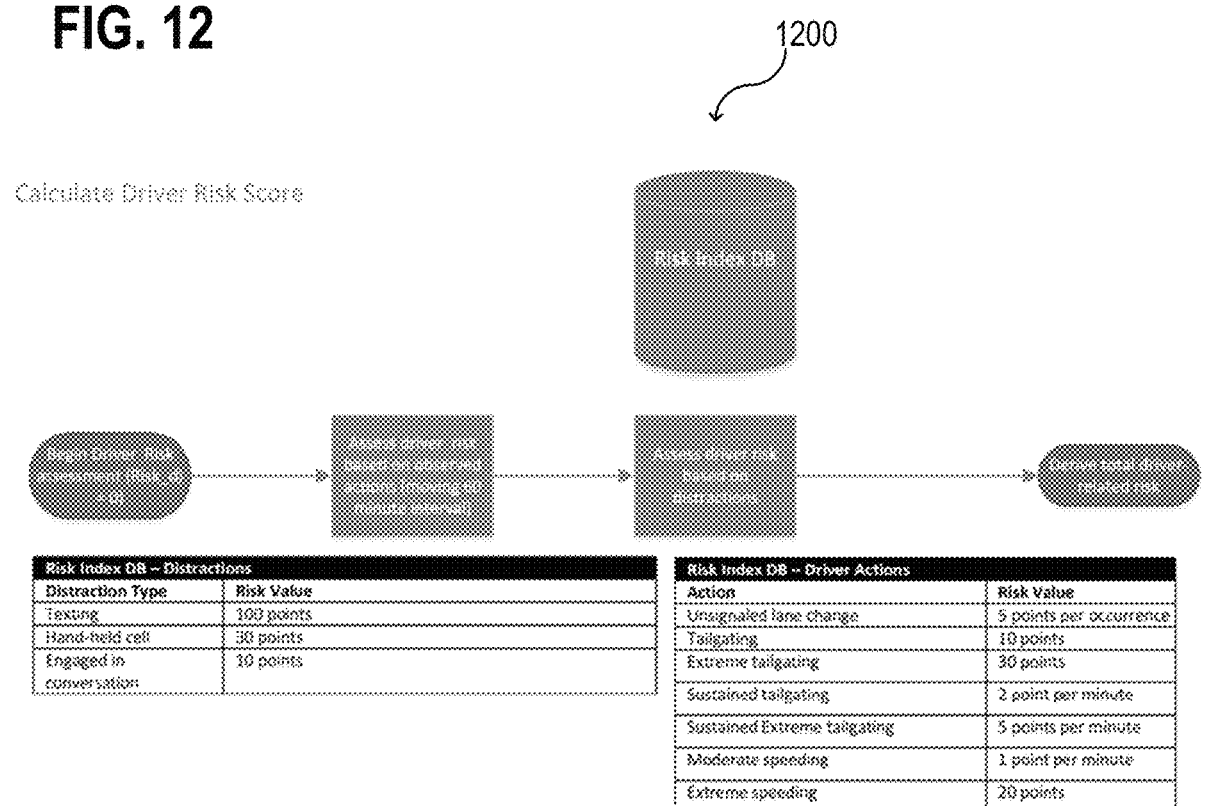
FIG. 12 shows exemplarily a flow diagram of calculating a driver risk value, according to some aspects.
Figure 13:
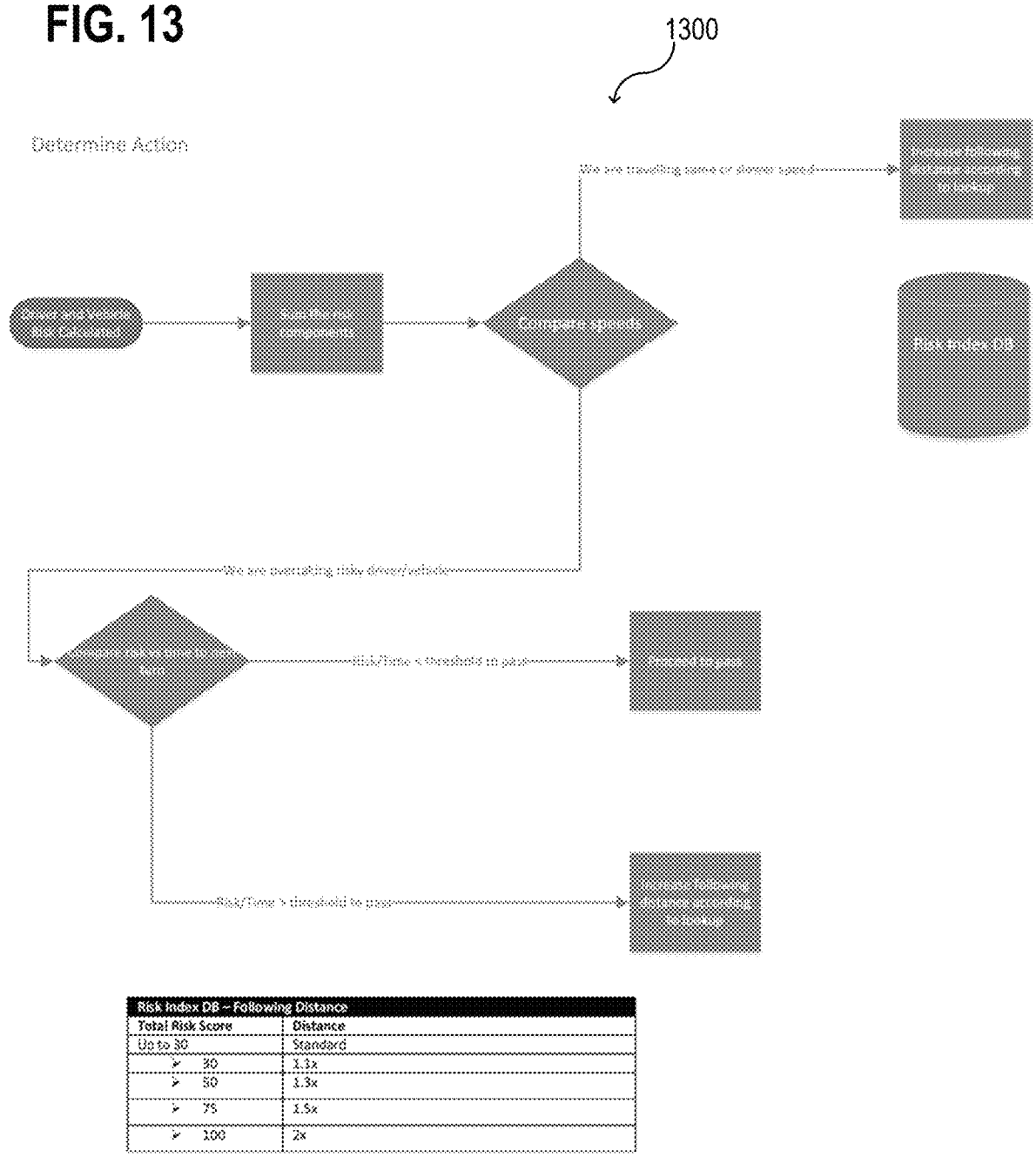
FIG. 13 shows exemplarily a flow diagram of determining an action based on the calculated vehicle risk value and driver risk value, according to some aspects.

FIG. 11 shows a flow chart 1100 for calculating a vehicle risk score. According to various aspects, the vehicle risk score may be the rating value or at least a part of a rating value. FIG. 12 shows a flow chart 1200 for calculating a driver risk score. According to various aspects, the driver risk score may be the rating value or at least a part of a rating value. FIG. 13 shows a flow chart 1300 for determining an action. In some aspects, the vehicle risk score and the driver risk score may be put together to determine the action.

As illustrated in FIG. 11, each other vehicle in a vicinity of a vehicle may have an assessed risk (represented by a numerical risk value) starting at zero points. When the cumulative risk exceeds a series of progressive thresholds, appropriate counter-measures may be taken. Two exemplary risk index databases are shown in FIG. 11. The respective risk index database associates, for example, a predefined amount of risk points to various predefined characteristic features, e.g., to a damage type or a tread depth value. In a similar, way, various risk index databases may be used to evaluate risk values for predefined vehicle conditions, e.g., predefined properties of the other vehicle.

For the vehicle risk, the tire tread depth and environmental conditions may be considered in combination. For example, a bald tire works just fine in dry conditions.

As illustrated in FIG. 12, a driver risk may be analyzed in a similar way using various risk databases. The driver risk may be reset after a predefined period of time (e.g., after 60 minutes). Otherwise, the model may likely deem all drivers to be risky after following them for several hours.

According to various aspects, the databased that may be used to determine the rating value associated with the risk potential of the analyzed obstacle may include an artificial intelligence to estimate certain properties of the vehicle, the driver, the passengers, etc.

For determining a course of action, as for example illustrated in FIG. 13, it may be considered whether or not the vehicle is on course to pass the other vehicle being assessed. If this is not the case, the vehicle can simply increase its following distance to the other vehicle based on the total risk profile of the other vehicle. If it is possible to pass the other vehicle (to overtake) the vehicle may consider whether to continue to pass the vehicle or abort. There may be three parameters involved in this decision: the risk score of the vehicle to overtake, the time until the next turn, and the speed difference between the two vehicles.

If the vehicle is scheduled to turn in a short distance (e.g., a mile), it may be no option to pass the other vehicle, even if a high-risk value was evaluated for the other vehicle. On the other hand, if the vehicle is scheduled to continue for a long distance (e.g., 100 miles) and the other vehicle is driving, for example, 10 mph slower than the vehicle, the vehicle may pass the other vehicle, e.g., unless a very high risk is evaluated for the performance of the overtaking maneuver.

In the following, various examples are provided that are related to the aspects described above and illustrated in the figures.

Example 1 is an obstacle analyzer, including: one or more sensors configured to receive obstacle identification information representing one or more identification features of an obstacle and obstacle condition information associated with one or more conditions of the obstacle; and one or more processors configured to identify the obstacle based on the received obstacle identification information and generate an identification value corresponding to the identified obstacle, determine a rating value representing a risk potential of the identified obstacle based on the received obstacle condition information, and store the rating value assigned to the identification value of the identified obstacle in one or more memories.

In Example 2, the obstacle analyzer of Example 1 may optionally further include that the obstacle is a vehicle and wherein the identification feature is a unique vehicle identifier.

In Example 3, the obstacle analyzer of Example 1 or 2 may optionally further include that the obstacle is a motor vehicle and wherein the identification feature is a license plate number of a license plate of the motor vehicle.

In Example 4, the obstacle analyzer of any one of Examples 1 to 3 may optionally further include that the determination of the rating value includes selecting the rating value from a predefined set of rating values based on the received obstacle condition information. The predefined set of rating values may include at least two distinct risk potential tiers.

In Example 5, the obstacle analyzer of any one of Examples 1 to 4 may optionally further include that the obstacle is a vehicle and wherein the determination of the rating value includes checking the received obstacle condition information for pre-defined characteristic features of the vehicle itself. The rating value may be generated based on respective vehicle risk values corresponding to the pre-defined characteristic features associated with the vehicle.

In Example 6, the obstacle analyzer of any one of Examples 1 to 4 may optionally further include that the obstacle is a completely autonomously driven vehicle, and that the determination of the rating value includes checking the received obstacle condition information for pre-defined characteristic features of the vehicle.

In Example 7, the obstacle analyzer of any one of Examples 1 to 4 may optionally further include that the obstacle is a vehicle driven by a driver, and that the determination of the rating value includes checking the received obstacle condition information for pre-defined characteristic features of the driver of the vehicle. The rating value may be generated based on respective driver risk values corresponding to the pre-defined characteristic features associated with the driver.

In Example 8, the obstacle analyzer of Example 6 or 7 may optionally further include that the pre-defined characteristic features of the vehicle include one or more operational status features representing an operational state of the vehicle.

In Example 9, the obstacle analyzer of Example 8 may optionally further include that the one or more operational status features include at least one of the following features: tire tread of tires, season-type of tires, damages of the vehicle, at least one of smoke or dust generated by the vehicle, a loading of the vehicle, presence of a trailer connected to the vehicle, size of the vehicle, presence of an underride guard attached to the vehicle, fluttering parts of the vehicle.

In Example 10, the obstacle analyzer of any one of Examples 6 to 9 may optionally further include that the pre-defined characteristic features of the vehicle include one or more characteristic make and/or model features representing a make and/or model of the vehicle.

In Example 11, the obstacle analyzer of any one of Examples 6 to 10 may optionally further include that pre-defined characteristic features of the vehicle include one or more tune-up features representing a tune-up of the vehicle.

In Example 12, the obstacle analyzer of any one of Examples 6 to 11 may optionally further include that the pre-defined characteristic features of the vehicle include one or more driving patterns representing a driving behavior associated with the vehicle in traffic.

In Example 13, the obstacle analyzer of Example 12 may optionally further include that the one or more driving patterns represent at least one of the following: a lane shifting behavior, an acceleration behavior, a braking behavior, a tailgating or safety distance keeping behavior, a traffic sign observance behavior, a lane keeping behavior.

In Example 14, the obstacle analyzer of any one of Examples 6 to 13 may optionally further include that the pre-defined characteristic features of the vehicle include content of one or more stickers on the vehicle.

In Example 15, the obstacle analyzer of Example 6 may optionally further include that the pre-defined characteristic features of the driver include one or more characteristic distraction features representing one or more situations where the driver of the vehicle is distracted from observing traffic.

In Example 16, the obstacle analyzer of Example 15 may optionally further include that the one or more situations where the driver of the vehicle is distracted from observing traffic includes at least one of the following situations: the driver reading a book, the driver listening to music, the driver eating or drinking, the driver using an electronic communication device, the driver observing one or more displays inside the vehicle, the driver sleeping, the driver being unconscious, the driver interacting with another passenger in the vehicle.

In Example 17, the obstacle analyzer of any one of Examples 1 to 16 may optionally further include that the determination of the rating value further includes determining a current weather condition and considering the current weather condition during the generation of the rating value.

In Example 18, the obstacle analyzer of any one of Examples 1 to 17 may optionally further include that the rating value assigned to the corresponding identified obstacle is reduced or reset after a predefined time.

In Example 19, the obstacle analyzer of any one of Examples 1 to 18 may optionally further include that the one or more sensors include one or more cameras and that at least one of the identification of the obstacle or the determination of the rating value is based on an image analysis of one or more images obtained by the one or more cameras.

In Example 20, the obstacle analyzer of any one of Examples 1 to 18 may optionally further include that the one or more sensors include one or more receivers and that at least one of the identification of the obstacle or the determination of the rating value is based on data received by the one or more receivers.

Example 21 is a method for analyzing one or more obstacles, the method including: receiving obstacle identification information representing an identification feature of an obstacle and obstacle condition information associated with one or more conditions of the obstacle; identifying the obstacle based on the received obstacle identification information and generate an identification value corresponding to the identified obstacle; determining a rating value representing a risk potential of the identified obstacle based on the received obstacle condition information; and storing the rating value assigned to the identification value of the identified obstacle.

In Example 22, the method of Example 21 may optionally further include that the obstacle is a vehicle and wherein the identification feature is a unique vehicle identifier.

In Example 23, the method of Example 21 or 22 may optionally further include that the obstacle is a motor vehicle and that the identification feature is a license plate number of a license plate of the motor vehicle.

In Example 24, the method of any one of Examples 21 to 23 may optionally further include that determining the rating value includes selecting the rating value from a predefined set of rating values based on the received obstacle condition information. The predefined set of rating values may include at least two distinct risk potential tiers.

In Example 25, the method of any one of Examples 21 to 24 may optionally further include that the obstacle is a vehicle and wherein determining the rating value includes checking the received obstacle condition information for pre-defined characteristic features of the vehicle itself. The rating value may be generated based on respective vehicle risk values corresponding to the pre-defined characteristic features associated with the vehicle.

In Example 26, the method of any one of Examples 21 to 24 may optionally further include that the obstacle is a completely autonomously driven vehicle, and that determining the rating value includes checking the received obstacle condition information for pre-defined characteristic features of the vehicle.

In Example 27, the method of any one of Examples 21 to 24 may optionally further include that the obstacle is a vehicle driven by a driver, and that determining the rating value includes checking the received obstacle condition information for pre-defined characteristic features of the driver of the vehicle. The rating value may be generated based on respective driver risk values corresponding to the pre-defined characteristic features associated with the driver.

In Example 28, the method of Example 26 or 27 may optionally further include that the pre-defined characteristic features of the vehicle include one or more operational status features representing an operational state of the vehicle.

In Example 29, the method of Example 28 may optionally further include that the one or more operational status features include at least one of the following features: tire tread of tires, season-type of tires, damages of the vehicle, at least one of smoke or dust generated by the vehicle, a loading of the vehicle, presence of a trailer connected to the vehicle, size of the vehicle, presence of an underride guard attached to the vehicle, fluttering parts of the vehicle.

In Example 30, the method of any one of Examples 26 to 29 may optionally further include that the pre-defined characteristic features of the vehicle include one or more characteristic make and/or model features representing a make and/or model of the vehicle.

In Example 31, the method of any one of Examples 26 to 30 may optionally further include that the pre-defined characteristic features of the vehicle include one or more tune-up features representing a tune-up of the vehicle.

In Example 32, the method of any one of Examples 26 to 31 may optionally further include that the pre-defined characteristic features of the vehicle include one or more driving patterns representing a driving behavior associated with the vehicle in traffic.

In Example 33, the method of Example 32 may optionally further include that the one or more driving patterns represent at least one of the following: a lane shifting behavior, an acceleration behavior, a braking behavior, a tailgating or safety distance keeping behavior, a traffic sign observance behavior, a lane keeping behavior.

In Example 34, the method of any one of Examples 26 to 33 may optionally further include that the pre-defined characteristic features of the vehicle include content of one or more stickers on the vehicle.

In Example 35, the method of Example 26 may optionally further include that the pre-defined characteristic features of the driver include one or more characteristic distraction features representing one or more situations where the driver of the vehicle is distracted from observing traffic.

In Example 36, the method of Example 35 may optionally further include that the one or more situations where the driver of the vehicle is distracted from observing traffic includes at least one of the following situations: the driver reading a book, driver listening to music, the driver eating or drinking, the driver using an electronic communication device, the driver observing one or more displays inside the vehicle, the driver sleeping, the driver being unconscious, the driver interacting with another passenger in the vehicle.

In Example 37, the method of any one of Examples 21 to 36 may optionally further include that determining the rating value further includes determining a current weather condition and considering the current weather condition during the generation of the rating value.

In Example 38, the method of any one of Examples 21 to 37 may optionally further include that the rating value assigned to the corresponding identified obstacle is reduced or reset after a predefined time.

In Example 39, the method of any one of Examples 21 to 38 may optionally further include that one or more cameras may be used to receive the obstacle identification information and/or the obstacle condition information and that at least one of identifying the obstacle or determining the rating value is based on an image analysis of one or more images obtained by the one or more cameras.

In Example 40, the method of any one of Examples 21 to 38 may optionally further include that one or more receivers may be used to receive the obstacle identification information and/or the obstacle condition information and that at least one of identifying the obstacle or determining the rating value is based on data received by the one or more receivers.

Example 41 is a vehicle control system, including: one or more sensors configured to receive obstacle identification information representing an identification feature of an obstacle in a vicinity of a vehicle; one or more memories including a plurality of reference identification values representing a plurality of previously identified obstacles, each of the plurality of reference identification values having a rating value assigned thereto; and one or more processors configured to identify the obstacle based on the received obstacle identification information and generate an identification value, compare the identification value with one or more of the plurality of reference identification values, and, in the case that the identification value matches a reference identification value of the plurality of reference identification values, (executing at least one of a triggering or a modification of) at least one of trigger or modify a driving operation based on the rating value assigned to the reference identification value.

In Example 42, the vehicle control system of Example 41 may optionally further include that the driving operation includes keeping a predefined safety distance, and that the modification of the driving operation includes increasing the predefined safety distance in the case that the rating value is at a predefined threshold.

In Example 43, the vehicle control system of Example 41 may optionally further include that the driving operation includes an overtaking maneuver to overtake the vehicle.

In Example 44, the vehicle control system of Example 43 may optionally further include that the overtaking maneuver includes determining a relative speed of the vehicle to be overtaken and a free space to overtake the vehicle.

Example 45 is a method for controlling a vehicle, the method including: receiving obstacle identification information representing an identification feature of an obstacle in a vicinity of a vehicle; identifying the obstacle based on the received obstacle identification information and generating an identification value corresponding to the obstacle; comparing the identification value with one or more reference identification values of a plurality of reference identification values, the plurality of reference identification values representing a plurality of previously identified obstacles, each of the plurality of reference identification values having a rating value assigned thereto; and, in the case that the identification value matches a reference identification value of the plurality of reference identification values; and executing at least one of a triggering or a modification of a driving operation based on the rating value assigned to the reference identification value.

In Example 46, the method of Example 45 may optionally further include that the driving operation includes keeping a predefined safety distance, and that the modification of the driving operation includes increasing the predefined safety distance in the case that the rating value is at a predefined threshold.

In Example 47, the method of Example 45 may optionally further include that the driving operation includes an overtaking maneuver to overtake the vehicle.

In Example 48, the method of Example 47 may optionally further include that the overtaking maneuver includes determining a relative speed of the vehicle to be overtaken and a free space to overtake the vehicle.

In Example 49, the method of any one of Examples 45 to 48 may optionally further include that the vehicle is a car.

In Example 50, the method of Example 49 may optionally further include that the identification feature is a license plate number of the car.

Example 51 is a vehicle, including an obstacle analyzer according to any one of Examples 1 to 20. Further, the one or more processors of the obstacle analyzer may be configured to identify a current obstacle based on the received obstacle identification information and generate a current identification value, compare the current identification value with the identification value stored in the one or more memories, and, in the case that the current identification value matches the stored identification value, at least one of trigger or modify a driving operation based on the stored rating value assigned to the stored identification value.

Example 52 is a vehicle control system, including: one or more sensors configured to receive current obstacle identification information representing an identification feature of an obstacle in a vicinity of a vehicle; one or more memories including stored risk values assigned to stored identification values of a plurality of previously identified obstacles; one or more processors configured to identify the obstacle based on the received current obstacle identification information, check whether a risk value is stored in the one or more memories for the identified obstacle, and, in the case that a risk value is stored, at least one of trigger or modify a driving operation based on the risk value.

Example 53 is a vehicle analyzer, including: one or more sensors configured to receive vehicle identification information representing an identification feature of an vehicle, vehicle condition information associated with one or more conditions of the vehicle, and driver information associated with a driver of the vehicle; one or more processors configured to determine vehicle risk data representing a risk potential of the vehicle based on the received identification information and the received vehicle condition information, determine driver risk data representing a risk potential of the driver of the vehicle based one the received driver information and the received vehicle condition information, determine a total risk value from the determined vehicle risk data and the determined driver risk data, set one or more first driving operation parameters for a driving operation in the case that the total risk value is below a predefined threshold, set one or more second driving operation parameters for the driving operation in the case that the total risk value is above a predefined threshold.

Example 54 is an obstacle analyzer, including: one or more sensors configured to receive obstacle identification information representing an identification feature of an obstacle and obstacle condition information associated with one or more conditions of the obstacle; a computing system configured to determine risk data representing a risk potential of the obstacle, the determination of the risk data is based on the received obstacle identification information and the received obstacle condition information, and store the risk data for the obstacle.

Example 55 is an obstacle analyzer, including: one or more sensors, one or more processors, and one or more memories; the one or more sensors are configured to receive identification information of a plurality of obstacles and the one or more processors are configured to identify each obstacle of the plurality of obstacles based on the received identification information; the one or more sensors are further configured to receive condition information associated with one or more conditions of each identified obstacle; the one or more processors are further configured to determine a risk value for each identified obstacle representing a risk potential of the respective obstacle based on the received obstacle condition information, and store the risk value for each identified obstacle.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. An obstacle analyzer, comprising:
one or more sensors configured to receive
obstacle identification information representing one or more identification features of an obstacle and
obstacle condition information associated with one or more conditions of the obstacle, wherein the obstacle comprises a vehicle and the one or more conditions of the obstacle comprise one or more vehicle conditions of the vehicle, wherein the one or more vehicle conditions comprise an extent to which a specification of the vehicle differs from a corresponding factory specification; and
one or more processors configured to
identify the obstacle based on the received obstacle identification information and generate an identification value corresponding to the identified obstacle,
determine a rating value representing a risk potential of the identified obstacle based on the received obstacle condition information, wherein the determination of the rating value comprises the one or more processors configured to select the rating value from a predefined set of rating values based on the obstacle condition information, wherein the predefined set of rating values comprises at least two distinct risk potential tiers, and
store the rating value assigned to the identification value of the identified obstacle in one or more memories.

2. The obstacle analyzer of claim 1,
wherein the obstacle is a vehicle and wherein the identification feature is a unique vehicle identifier.

3. The obstacle analyzer of claim 1,
wherein the obstacle is a motor vehicle and wherein the obstacle identification information is a license plate number of a license plate of the motor vehicle.

4. The obstacle analyzer of claim 1,
wherein the obstacle is a vehicle and wherein the determination of the rating value comprises checking the received obstacle condition information for pre-defined characteristic features of the vehicle itself, wherein the rating value is generated based on respective vehicle risk values corresponding to the pre-defined characteristic features associated with the vehicle.

5. The obstacle analyzer of claim 1,
wherein the obstacle is a completely autonomously driven vehicle, and
wherein the determination of the rating value comprises checking the received obstacle condition information for pre-defined characteristic features of the vehicle.

6. The obstacle analyzer of claim 1,
wherein the obstacle is a vehicle driven by a driver, and
wherein the determination of the rating value comprises checking the received obstacle condition information for pre-defined characteristic features of the driver of the vehicle, wherein the rating value is generated based on respective driver risk values corresponding to the pre-defined characteristic features associated with the driver.

7. The obstacle analyzer of claim 5,
wherein the pre-defined characteristic features of the vehicle comprise one or more operational status features representing an operational state of the vehicle.

8. The obstacle analyzer of claim 5,
wherein the pre-defined characteristic features of the vehicle comprise one or more characteristic make and/or model features representing a make and/or model of the vehicle.

9. The obstacle analyzer of claim 5,
wherein the pre-defined characteristic features of the vehicle comprise one or more driving patterns representing a driving behavior associated with the vehicle in traffic.

10. The obstacle analyzer of claim 5,
wherein the pre-defined characteristic features of the vehicle comprise content of one or more stickers on the vehicle.

11. The obstacle analyzer of claim 6,
wherein the pre-defined characteristic features of the driver comprise one or more characteristic distraction features representing one or more situations where the driver of the vehicle is distracted from observing traffic.

12. The obstacle analyzer of claim 1,
wherein the determination of the rating value further comprises determining a current weather condition and considering the current weather condition during the generation of the rating value.

13. The obstacle analyzer of claim 1,
wherein the rating value assigned to the corresponding identified obstacle is reduced or reset after a predefined time.

14. The obstacle analyzer of claim 1,
wherein the one or more sensors comprise one or more cameras and wherein at least one of the identification of the obstacle or the determination of the rating value is based on an image analysis of one or more images obtained by the one or more cameras.

15. The obstacle analyzer of claim 1,
wherein the one or more sensors comprise one or more receivers and wherein at least one of the identification of the obstacle or the determination of the rating value is based on data received by the one or more receivers.

16. A vehicle control system, comprising:
one or more sensors configured to receive obstacle identification information representing an identification feature of an obstacle in a vicinity of a vehicle;
one or more memories comprising a plurality of reference identification values representing a plurality of previously identified obstacles, each of the plurality of reference identification values having a rating value assigned thereto, wherein the rating value is based on an extent to which a specification of the vehicle differs from a corresponding factory specification; and
one or more processors configured to
identify the obstacle based on the received obstacle identification information and generate an identification value,
compare the identification value with one or more of the plurality of reference identification values, and,
if the identification value matches a reference identification value of the plurality of reference identification values, modify a driving operation based on the rating value assigned to the reference identification value.

17. The vehicle control system of claim 16,
wherein the driving operation comprises keeping a pre-defined safety distance, and wherein modifying the driving operation comprises increasing the predefined safety distance if the rating value is at a predefined threshold.

18. The vehicle control system of claim 16,
wherein the driving operation comprises an overtaking maneuver to overtake the vehicle.

19. A vehicle, comprising:

an obstacle analyzer, the obstacle analyzer comprising one or more sensors configured to receive obstacle identification information representing one or more identification features of an obstacle and obstacle condition information associated with one or more conditions of the obstacle, wherein the obstacle condition information comprises one or more vehicle conditions of a vehicle represented by the obstacle, wherein the one or more vehicle conditions comprise an extent to which a specification of the vehicle differs from a corresponding factory specification; and the obstacle analyzer further comprising one or more processors configured to identify the obstacle based on the received obstacle identification information and generate an identification value corresponding to the identified obstacle, determine a rating value representing a risk potential of the identified obstacle based on the received obstacle condition information, and store the rating value assigned to the identification value of the identified obstacle in one or more memories;

wherein the one or more processors of the obstacle analyzer are further configured to identify a current obstacle based on the received obstacle identification information and generate a current identification value, compare the current identification value with the identification value stored in the one or more memories, and, if the current identification value matches the stored identification value, modify a driving operation based on the stored rating value assigned to the stored identification value.

* * * * *